(12) United States Patent
Bird

(10) Patent No.: US 9,223,026 B2
(45) Date of Patent: Dec. 29, 2015

(54) GNSS REFERENCE FOR SUBSCRIBED PRECISIONS

(71) Applicant: Trimble Navigation Limited, Sunnyvale, CA (US)

(72) Inventor: David G. Bird, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 509 days.

(21) Appl. No.: 13/675,186

(22) Filed: Nov. 13, 2012

(65) Prior Publication Data

US 2014/0132444 A1    May 15, 2014

(51) Int. Cl.
| G01S 19/05 | (2010.01) |
| G01S 19/07 | (2010.01) |
| G01S 19/04 | (2010.01) |

(52) U.S. Cl.
CPC ........ *G01S 19/07* (2013.01); *G01S 19/04* (2013.01)

(58) Field of Classification Search
CPC ........... G01S 1/08; G01S 19/05; G01S 19/09; G01S 19/07; G01S 19/04
USPC ................................ 342/386, 357.42, 357.46
See application file for complete search history.

(56) References Cited

U.S. PATENT DOCUMENTS

| 5,148,179 A | 9/1992 | Allison |
| 5,343,209 A | 8/1994 | Sennott et al. |
| 5,359,332 A | 10/1994 | Allison et al. |
| 5,467,282 A | 11/1995 | Dennis |
| 5,477,228 A | 12/1995 | Tiwari et al. |
| 5,510,798 A | 4/1996 | Bauer |
| 5,990,825 A | 11/1999 | Ito |
| 6,204,806 B1 | 3/2001 | Hoech |
| 6,268,824 B1 | 7/2001 | Zhodzishky et al. |
| 6,373,432 B1 | 4/2002 | Rabinowitz et al. |
| 6,421,003 B1 | 7/2002 | Riley et al. |
| 6,501,422 B1 | 12/2002 | Nichols |
| 6,640,184 B1 | 10/2003 | Rabe |
| 6,754,584 B2 | 6/2004 | Pinto et al. |
| 6,948,062 B1 * | 9/2005 | Clapper .................. 713/162 |

(Continued)

FOREIGN PATENT DOCUMENTS

| DE | 697 03 227 T2 | 5/2001 |
| EP | 0 242 115 A2 | 10/1987 |

(Continued)

OTHER PUBLICATIONS

Landau, Vollath & Chen, "Virtual Reference Station Systems", Journal of Global Positioning Systems, vol. 1, No. 2, pp. 137-143, Trimble Terrasat GmbH, Dec. 6, 2002.

(Continued)

*Primary Examiner* — Harry Liu

(57) ABSTRACT

This application discloses a GNSS reference apparatus having a vector error generator and a reference data server. The vector error generator generates one or more sequences of keyed intentional errors made confidential with confidential error keys, and then combines the sequences to generate a sequence of reference erroneous positions. The reference data server issues GNSS position-determination reference data based on the reference erroneous positions where the keyed intentional errors for at least one of the confidential sequences are reversible with confidential access to the corresponding confidential error key for determining a GNSS-based position.

27 Claims, 14 Drawing Sheets

(56) References Cited

U.S. PATENT DOCUMENTS

| | | | |
|---|---|---|---|
| 7,079,075 | B1 | 7/2006 | Connor et al. |
| 7,158,885 | B1 | 1/2007 | Janky et al. |
| 7,202,813 | B2 | 4/2007 | Bird et al. |
| 7,227,496 | B2 | 6/2007 | Bird et al. |
| 7,277,458 | B2 | 10/2007 | Cho et al. |
| 7,286,085 | B2 | 10/2007 | Kolanek et al. |
| 7,292,183 | B2 | 11/2007 | Bird et al. |
| 7,336,225 | B1 | 2/2008 | Connor et al. |
| 7,468,693 | B1 | 12/2008 | Bird |
| 7,474,896 | B2 | 1/2009 | Mohi et al. |
| 7,580,794 | B2 | 8/2009 | Janky et al. |
| 8,199,049 | B2 | 6/2012 | Bird et al. |
| 2007/0055445 | A1* | 3/2007 | Janky et al. .................. 701/213 |
| 2007/0249364 | A1 | 10/2007 | Bells et al. |
| 2009/0140914 | A1 | 6/2009 | Talbot et al. |
| 2013/0223626 | A1* | 8/2013 | Edge et al. .................... 380/270 |
| 2014/0104102 | A1* | 4/2014 | Enge et al. ............... 342/357.42 |

FOREIGN PATENT DOCUMENTS

| | | |
|---|---|---|
| EP | 0822 421 B1 | 2/1998 |
| KR | 1020040074313 A | 8/2004 |
| WO | WO 2006/125137 A1 | 11/2006 |

OTHER PUBLICATIONS

Landau, Vollath & Chen, "Virtual Reference Stations versus Broadcast Solutions in Network RTK", Trimble Terrasat GmbH, pp. 1-15, GNSS 2003, Apr. 2003, Graz, Austria.
Trimble, "Virtual Reference Station VRS", "VRS System Productivity", "VRS System Technology", "Flexible VRS Networks", 8 pages, 2001, Trimble Navigation Limited, Dayton, Ohio.
Trimble, "Datasheet SPS551 and SPS551H Location GPS Receivers", Trimble Navigation Limited Construction Division, 3 pages, Dayton, Ohio, 2007.
Trimble, "Datasheet SPS651 Modular GPS Receiver and Site Supervisor System", Trimble Navigation Limited Construction Division, 3 pages, Dayton, Ohio, 2007.
Trimble, "User Guide SPSx51 Modular GPS Receivers", Trimble Navigation Limited, pp. 1-25, 31-40 & 109-150, Sunnyvale, California, copyright 2006-2007.
PCT, Written Opinion of the International Search Authority U.S. Appl. No. 11/138,223, WO2006/127316, PCT/US2006/018728 completed Oct. 23, 2006.
PCT, International Preliminary Report on Patentability U.S. Appl. No. 11/138,223, WO2006/127316, PCT/US/2006/018728, issued Nov. 30, 2007.
PCT, Written Opinion of the International Search Authority U.S. Appl. No. 11/146,757, WO 2006/132764, PCT/US/2006/018729 mailed Oct. 18, 2006.
PCT, International Preliminary Report on Patentability U.S. Appl. No. 11/146,757, WO2006/132764, PCT/US/2006/018729 dated Mar. 5, 2008.
PCT, Written Opinion of the International Search Authority US/147842, WO2006/135526, PCT/US/2006/018730 completed Oct. 23, 2006.
PCT, International Preliminary Examination Report U.S. Appl. No. 11/147,842, WO2006/135526, PCT/US/2006/018730 completed Oct. 30, 2008.
PCT, International Preliminary Report on Patentability, Corrected, U.S. Appl. No. 11/146,757, WO 2006/135526, PCT/US/2006/018730 mailed May 4, 2009.
PCT, Written Opinion of the International Search Authority, U.S. Appl. No. 11/139,209, WO 2006/130334, PCT/US/2006/018731 mailed Oct. 18, 2006.
PCT, International Preliminary Report on Patentability U.S. Appl. No. 11/139,209, WO2006/130334, PCT/US/2006/018731 issued Nov. 30, 2007.
German Patent Office action dated Nov. 18, 2013 for German application 11 2006 001 256.8 based on U.S. Appl. No. 11/147,842.
English translation of German Patent Office action dated Nov. 18, 2013 for German application 11 2006 001 256.8 based on U.S. Appl. No. 11/147,842.
German Patent Office action dated Nov. 14, 2013 for German application 11 2006 001 220.7 based on U.S. Appl. No. 11/146,757.
English translation of German Patent Office action dated Nov. 14, 2013 for German application 11 2006 001 220.7based on U.S. Appl. No. 11/146,757.
German Patent Office action dated Nov. 6, 2013 for German application 11 2006 001 018.2 based on U.S. Appl. No. 11/139,209.
English translation of German Patent Office action dated Nov. 6, 2013 for German application 11 2006 001 018.2 based on U.S. Appl. No. 11/139,209.
German Patent Office action dated Nov. 13, 2013 for German application 11 2006 001 023.9 based on U.S. Appl. No. 11/138,223.
English translation of German Patent Office action dated Nov. 13, 2013 for German application 11 2006 001 023.9 based on U.S. Appl. No. 11/138,223.
USPTO action papers mailed Feb. 1, 2007 for U.S. Appl. No. 11/147,842.
USPTO action papers mailed Aug. 24, 2007 for U.S. Appl. No. 11/147,842.
USPTO action papers mailed May 3, 2006 for U.S. Appl. No. 11/146,757.
USPTO action papers mailed Dec. 27, 2006 for U.S. Appl. No. 11/439,001.
USPTO action papers mailed Jul. 30, 2007 for U.S. Appl. No. 11/439,001.
USPTO action papers mailed Aug. 16, 2007 for U.S. Appl. No. 11/439,001.
USPTO action papers mailed Jan. 3, 2007 for U.S. Appl. No. 11/139,209.
USPTO action papers mailed Apr. 6, 2007 for U.S. Appl. No. 11/138,223.
USPTO action papers mailed Nov. 28, 2006 for U.S. Appl. No. 11/138,223.
USPTO action papers mailed Feb. 6, 2007 for U.S. Appl. No. 11/138,223.
USPTO action papers mailed Feb. 22, 2008 for U.S. Appl. No. 11/799,022.
USPTO action papers mailed Aug. 25, 2008 for U.S. Appl. No. 11/799,022.
USPTO action papers mailed Sep. 8, 2008 for U.S. Appl. No. 11/799,022.
USPTO action papers mailed Aug. 9, 2011 for U.S. Appl. No. 12/313,185.
USPTO action papers mailed Feb. 21, 2012 for U.S. Appl. No. 12/313,185.
USPTO action papers mailed Jun. 15, 2011 for U.S. Appl. No. 12/313,255.
USPTO action papers mailed Nov. 23, 2011 for U.S. Appl. No. 12/313,185.
PCT, International Search Report and Written Opinion of the International Searching Authority for PCT/US/2013/064111 mailed Jan. 27, 2014.
Espacenet Bibliographic data: JP2003149319 (A) May 21, 2003, Method for Providing Positioning Service, Hitachi.
English translation of German Patent Office action dated Jul. 5, 2010 for German application 11 2006 001 256.8-55 based on U.S. Appl. No. 11/147,842.
German Patent Office action dated Jul. 5, 2010 for German application 11 2006 001 256.8-55 based on U.S. Appl. No. 11/147,842.
PRC Patent Office action dated May 20, 2010 for PRC application 200680014561.0 based on U.S. Appl. No. 11/147,842.
English translation of German Patent Office action dated Jul. 5, 2010 for German application 11 2006 001 220.7-55 based on U.S. Appl. No. 11/146,757.
German Patent Office action dated Jul. 5, 2010 for German application 11 2006 001 220.7-55 based on U.S. Appl. No. 11/146,757.
PRC Office action dated Sep. 14, 2011 for PRC application 200680014521.6 based on U.S. Appl. No. 11/146,747.
PRC Office action dated Feb. 28, 2011 for PRC application 200680014521.6 based on U.S. Appl. No. 11/146,747.

(56) References Cited

OTHER PUBLICATIONS

English translation of German Patent Office action dated Jul. 19, 2010 for German application 11 2006 001 018.2-55 based on U.S. Appl. No. 11/139,209.
German Patent Office action dated Jul. 19, 2010 for German application 11 2006 001 018.2-55 based on U.S. Appl. No. 11/139,209.
PRC Office action dated Dec. 13, 2010 for PRC application 100680014293.2 based on U.S. Appl. No. 11/139,209.
PRC Office action dated May 20, 2010 for PRC application 100680014293.2 based on U.S. Appl. No. 11/139,209.
English translation of German Patent Office action dated Jul. 5, 2010 for German application 11 2006 001 023.9-55 based on U.S. Appl. No. 11/138,223.
PRC Office action dated Dec. 14, 2010 for PRC application 200680014162.4 based on U.S. Appl. No. 11/139,223.
PRC Office action dated May 20, 2010 for PRC application 200680014162.4 based on U.S. Appl. No. 11/139,223.

* cited by examiner

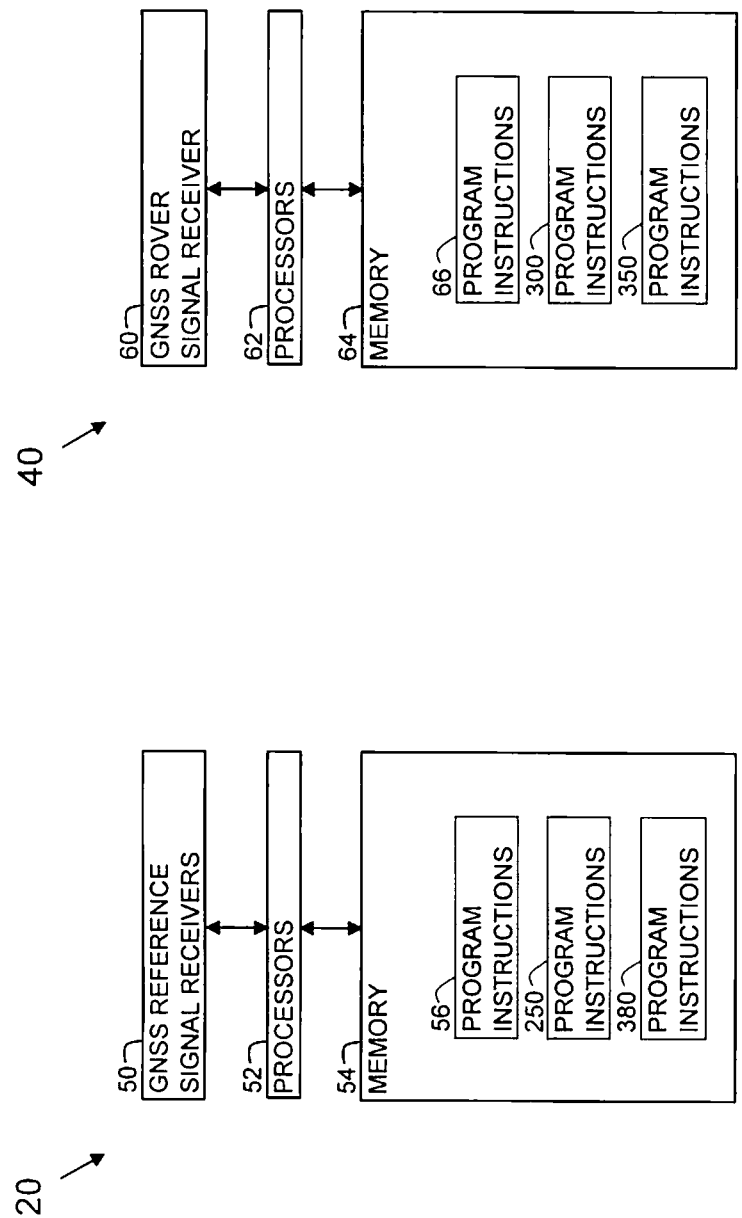

| ROVER SUBSCRIPTION CLASS | SUBSCRIBED PRECISIONS | | | |
|---|---|---|---|---|
| | SUBSCRIBED CONFIDENTIAL ERROR KEYS | NON-SUBSCRIBED CONFIDENTIAL ERROR KEYS | INTENTIONAL ERROR PARAMETER | SUBSCRIBED MAXIMUM ERROR |
| #1 | none | 1st, 2nd & nth | 15cm, 30cm & 55cm | ±100cm |
| #2 | 1st | 2nd & nth | 30cm & 55cm | ±85cm |
| #3 | 2nd | 1st & nth | 15cm & 55cm | ±70cm |
| #4 | 1st & 2nd | nth | 55cm | ±55cm |
| #5 | nth | 1st & 2nd | 15cm & 30cm | ±45cm |
| #6 | 1st & nth | 2nd | 30cm | ±30cm |
| #7 | 2nd & nth | 1st | 15cm | ±15cm |
| #8 | 1st, 2nd & nth | none | 00cm | 00cm |

Fig. 4A

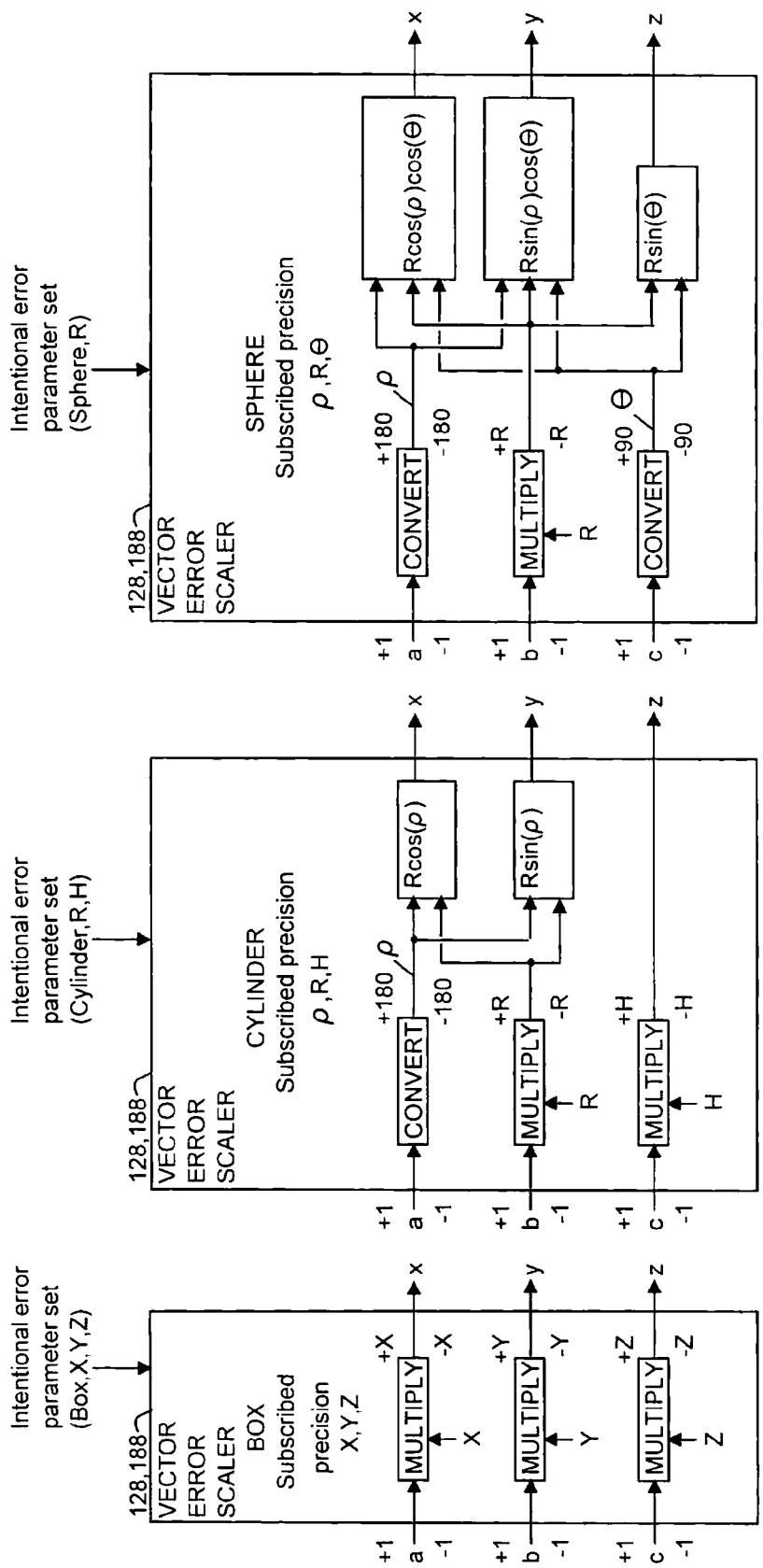

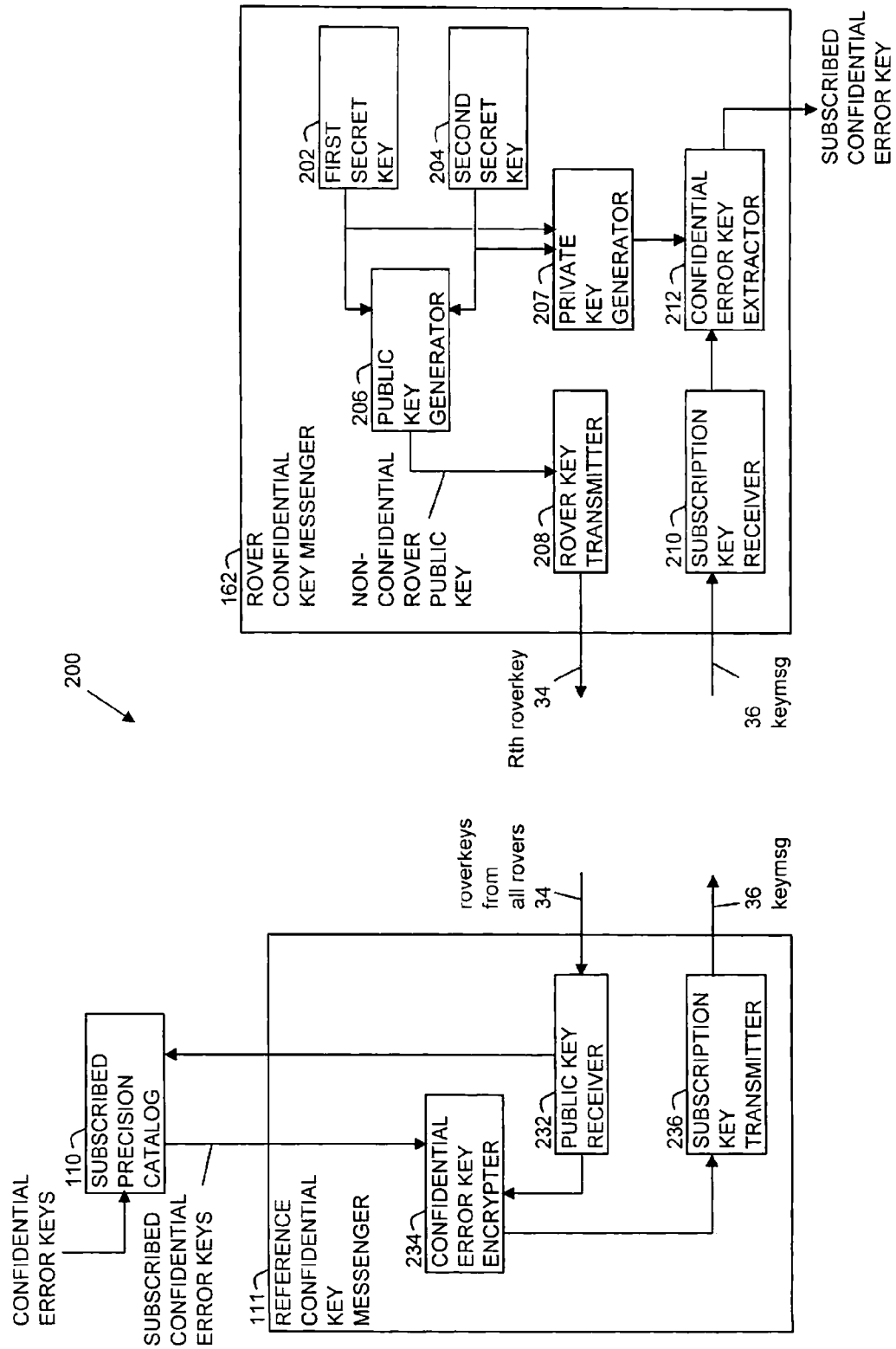

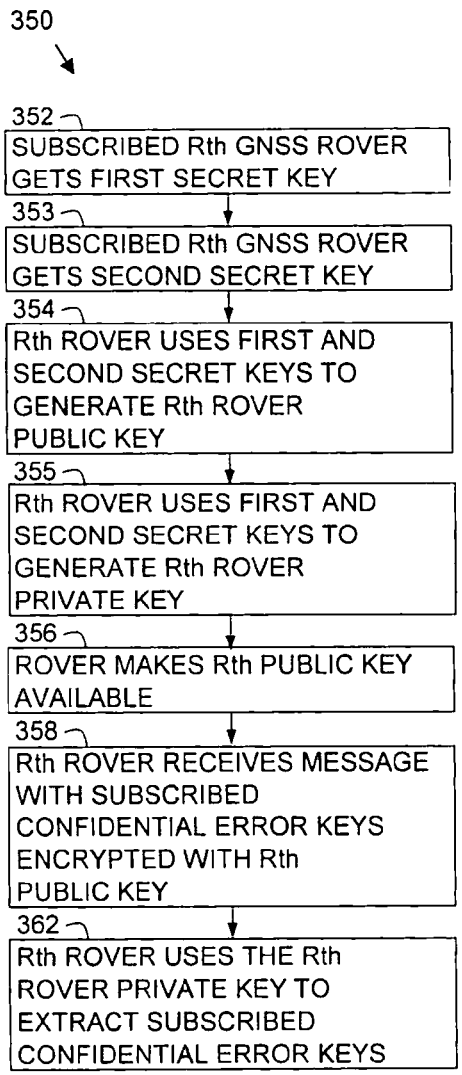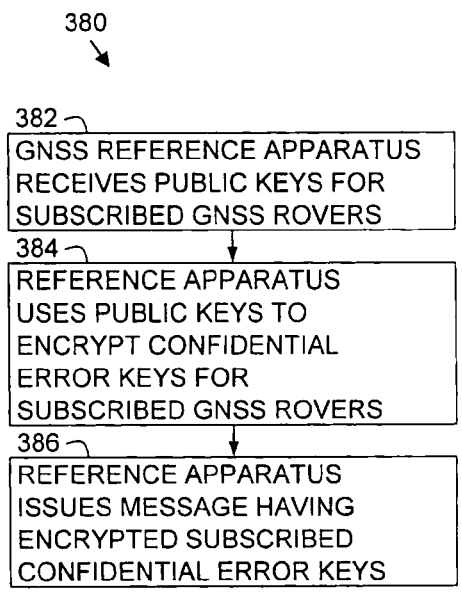
Fig. 12A                    Fig. 12B

US 9,223,026 B2

GNSS REFERENCE FOR SUBSCRIBED PRECISIONS

BACKGROUND

1. Field of the Invention

The invention relates generally to GNSS signal processing and more particularly to GNSS carrier phase signal processing for providing GNSS position determination with subscribed precision.

2. Description of the Background Art

The Global Positioning System (GPS) is operated by the United States government for providing free GPS positioning signals to all users around the world. Stand alone GPS receivers can use a coarse/acquisition (C/A) code in these signals for computing unaided positions having typical accuracies of about five meters or about two meters with WAAS. This level of precision is sufficient for many applications including most navigation applications. However, there are positioning applications, such as survey, mapping, machine control and agriculture, where greater precision and/or protection against outlier positions is needed.

Some of these needs are met by differential GPS systems that provide GPS code phase corrections. A GPS receiver that is constructed for differential GPS operation can use the code phase corrections for computing positions having typical accuracies of a few tens of centimeters to one meter. These accuracies are sufficient for most positioning applications. However, a user cannot be altogether confident in the accuracies of stand alone or differential GPS positions because the integrity of the positions is affected by outliers mostly due to multipath. Multipath reflections of the GPS signals can cause outlier errors of meters to tens of meters depending on the extra distances that are traveled by reflected signals.

Real time kinematic (RTK) systems use highly accurate carrier phase measurements of GPS signals in order to provide greater position accuracy and high integrity. A rover GPS receiver that is constructed for RTK operation can determine relative positions to an accuracy of about a centimeter to a few tens of centimeters. These positions have high integrity. It is very unlikely that any of the measurements corresponding to the position contain large multipath errors. Existing GPS RTK services provide RTK carrier phase measurements to the users for a cost that is largely driven by the fixed infrastructure costs for providing the system divided by the number of users. However, some users require precisions better than stand alone GNSS precision but do not require the centimeter precisions of the RTK systems. Some users have the need for the integrity of RTK-based positioning but do not require the full accuracy that it provides.

U.S. Pat. No. 7,292,183 by Bird partially resolves this requirement by providing RTK reference carrier phase data for degraded rover accuracy by dithering (intentionally varying) the reference carrier phases before they are transmitted. This dithering is done with an irreversible process to ensure that the user of the rover can never obtain the high-accuracy position that would be obtained with the pre-degradation carrier phases. An aspect of the U.S. Pat. No. 7,292,183 is that the reference data provides the same selected positional precision to all GPS rovers.

SUMMARY

This disclosure describes a GNSS reference apparatus and a GNSS rover to provide multiple subscribed positional precisions for multiple GNSS rovers by providing keyed intentional errors that are selectively reversible.

The keyed intentional errors of this system are selectively reversible at the GNSS rovers with confidential error keys. The GNSS rovers do not need to be secure against tampering to prevent an unauthorized user from reversing the keyed intentional errors. The GNSS reference apparatus provides GNSS position-determination reference data based on reference erroneous positions from one or more keyed intentional error sequences associated with one or more confidential error keys. The GNSS position determination reference data can be carried in a single GNSS reference data stream. Subscribed precisions for the GNSS rover positions are obtained without making any changes to or having any control over the GNSS signals broadcast from GNSS satellites. Subscribed precisions for the GNSS rover positions are obtained without changing or adding errors to the parameters of the GNSS satellite positioning information that is broadcast from GNSS satellites. Subscribed selective positions for the GNSS rover positions are obtained without dithering (adding variations to) the ephemeris parameters or clocks for the GNSS satellites. A GNSS rover with confidential access to a particular set of confidential error keys is enabled to determine a subscribed rover position with a subscribed precision having an error level that can be better than the error level of the reference erroneous positions but not as good as the intrinsic error level of the true GNSS reference position depending on the particular set of confidential error keys to which it has confidential access.

BRIEF DESCRIPTIONS OF THE DRAWINGS

FIGS. 1A and 1B are block diagrams of a GNSS reference apparatus and a GNSS rover, respectively.

FIG. 4A is an exemplary table of subscribed precisions for the system.

FIGS. 10A, 10B and 10C are illustrations for a vector error scaler for box, cylindrical and spherical error zones.

FIGS. 11A and 11B are block diagrams for reference and rover confidential key messengers.

FIGS. 12A and 12B are flow charts of methods in a GNSS rover and a GNSS reference apparatus, respectively, for confidential access for subscribed confidential error keys.

DETAILED DESCRIPTION

This disclosure has claims and a detailed description of several embodiments for implementing the claims. The claims describe the scope of the idea. The detailed description shows embodiments for implementing the idea of the claims but is not exhaustive. Numerous other alternatives, modifications and equivalents of the embodiments described herein will be apparent to someone skilled in the art as within the scope of these claims. The embodiments are written in terms of the global positioning system (GPS) or a generic global navigation satellite system (GNSS). The GNSS may be the global positioning system (GPS), the global orbiting navigation system (GLONASS), the Galileo system, the PRC Beidou or Compass system, other similar systems or a combination of these systems. It should also be noted that pseudolites may be used in place of satellites for broadcasting GNSS positioning signals. The term "confidential" is used in this application to mean private and secret.

Figure 1:
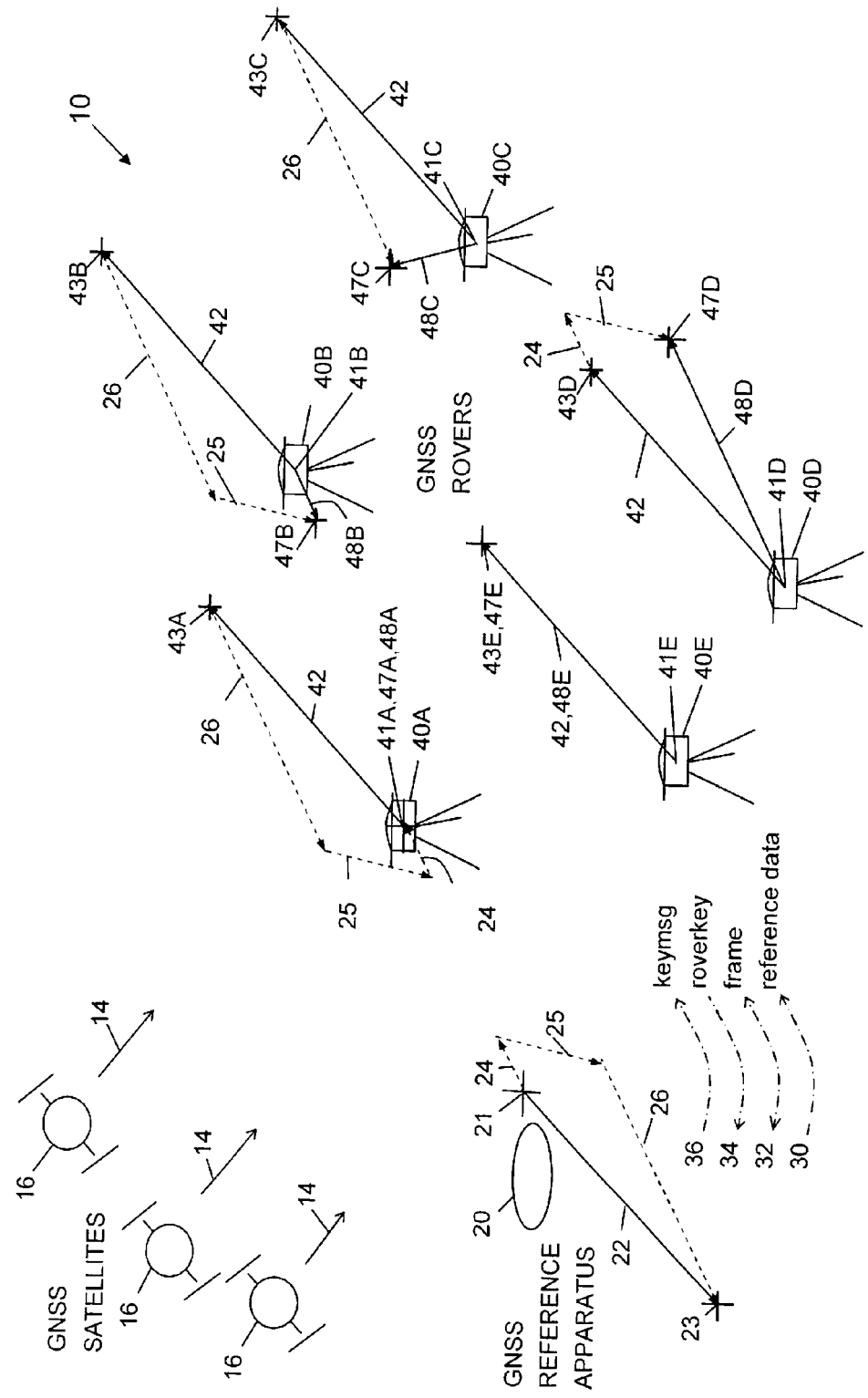
FIG. 1 is a diagram of a GNSS positioning system having a GNSS reference apparatus and GNSS rovers for providing subscribed positional precisions by intentionally degrading high precision GNSS reference data.

FIG. 1 is a diagram of a GNSS positioning system 10 that provides subscribed precisions for classes of users. The system 10 includes a GNSS reference apparatus 20 and one or more GNSS rovers 40. A GNSS reference apparatus 20 and a GNSS rover 40 communicate with each other but are separate entities. The GNSS reference apparatus 20 has a true reference position 21 having an intrinsic precision. The reference position 21 is based on surveys or some other means. Typically, the reference position 21 is determined by interpolating from the surveyed positions of several GNSS reference receivers. The intrinsic errors associated with the reference position 21 are considered to be zero for the purposes of this disclosure.

The GNSS reference apparatus 20 synthesizes a reference erroneous position 23 from the vector sum of the reference position 21 and a synthetic offset vector 22. The synthetic offset vector 22 is the vector sum of one or more keyed intentional errors, illustrated with exemplary vectors 24, 25 and 26. There may be 10's or more of keyed intentional errors for the system 10. The keyed intentional errors 24, 25 and 26 are generated as sequences made confidential with confidential error keys, respectively. The lengths (sizes) of the vectors of the keyed intentional errors 24, 25 and 26 are scaled by intentional error parameter sets where the parameter sets are respectively associated with the confidential error keys. The distributions of the vector lengths for the sequences of keyed intentional errors 24, 25 and 26 are controlled by filtering. The scaling and filtering determine the three dimensional shapes, sizes and distributions of spreads in space for error zones for vector sequences of keyed intentional errors 24, 25 and 26. The vector sum of the sequences of the keyed intentional errors 24, 25 and 26 provides a three dimensional shape, size and distribution of the spread for the error zone for a sequence of synthetic offset vectors 22. The vector combination of the reference position 21 and the sequence of synthetic offset vectors 22 provides a three dimensional shape, size and distribution of the spread for the error zone for a sequence of reference erroneous positions 23.

The reference apparatus 20 issues reference data 30 having position-determination reference data based on the reference erroneous position 23 to the GNSS rovers 40. The GNSS rovers 40 have actual positions 41 that are not available and they do not know. The GNSS rover 40 uses the position-determination information in the reference data 30 to determine a rover erroneous position 43 relative to the reference position 21. The rover erroneous position 43 has a non (not) subscribed error vector 42 that is the same magnitude and the opposite direction as the synthetic offset vector 22. The rover erroneous position 43 also has a small intrinsic error as a result of normal RTK processing. The RTK processing error is considered to be zero for this disclosure. A subscribed GNSS rover 40 may have access to all the confidential error keys but normally its subscription gives it access to a subset of the confidential error keys.

The GNSS rover 40 uses the one or more confidential error keys for which it has a subscription to reproduce the corresponding one or more sequences of keyed intentional errors 24, 25 and 26 in order to reverse (undo) the erroneous effect of the keyed intentional errors 24, 25 and 26. The GNSS rover 40 reverses the one or more keyed intentional errors 24, 25 and 26 to determine a subscribed rover position 47 relative to the reference position 21. The subscribed rover position 47 differs from the actual rover position 41 by a subscribed rover position error vector 48. The subscription provides a subscribed level of positional precision that depends on the keyed intentional errors 24, 25 and 26 that were not reversed. A user of a GNSS rover 40 gets a subscription for that GNSS rover 40 by an agreement with the operator of the GNSS reference apparatus 20.

The keyed intentional errors 24, 25 and 26 are grouped into a subscribed group and a non-subscribed group for a particular subscribed precision. Exemplary GNSS rovers 40A-E have actual rover positions, illustrated as 41A-E, that are not known or available to a user. The positions that are available to the user are subscribed rover positions 47A-E. The GNSS rovers 40A-E determine the subscribed rover positions 47A-E by determining rover erroneous positions 43A-E based on the reference erroneous position 23 and then reversing the particular keyed intentional errors 24, 25 and 26 that are associated with the confidential error keys for which the GNSS rovers 40A-E have subscriptions. The particular keyed intentional errors 24, 25 and 26 that are associated with the subscribed confidential error keys are the subscribed keyed intentional errors for which the particular class of GNSS rovers 40A-E have subscriptions. Roverkey signals 34A-E from the GNSS rovers 40A-E and keymsg signals 36 can enable confidential access for subscribed confidential error keys from the GNSS reference apparatus 20 to the GNSS rovers 40A-E.

The rover erroneous positions 43A-E are the vector combination of the actual rover positions 41A-E and the non-subscribed error vector 42. The difference between the subscribed rover positions 47A-E and the actual rover positions 41A-E is illustrated with error vectors 48A-E. In general a subscription enables the subscribed GNSS rover 40A-E to determine its subscribed position 47A-E with a precision between a best case equal to the intrinsic precision of the reference position 21 and a worst of equal to the precision of the reference erroneous position 23.

The GNSS rover 40A has the confidential error keys to subtract all of the keyed intentional errors 24, 25 and 26 to determine the subscribed rover position 47A that matches the actual rover position 41A. The GNSS rover 40B has the confidential error keys to reverse or subtract the keyed intentional errors 26 and 25 to determine the subscribed rover position 47B that differs from the actual rover position 41B by the rover error vector 48B. The GNSS rover 40C has the confidential error key to subtract the keyed intentional error 26 to determine the subscribed rover position 47C that differs from the actual rover position 41C by the rover vector error 48C. The GNSS rover 40D has the confidential error keys to subtract the keyed intentional errors 25 and 24 to determine the subscribed rover position 47D that differs from the actual rover position 41D by the rover error vector 48D. The GNSS rover 40E has no subscription and determines the subscribed rover position 47E equal to the rover erroneous position 43E that differs from the actual rover position 41E by the rover error vector 48E.

The reference data 30 may be transmitted by a signal over the air or by streaming from a web site that is available through the Internet or emailing. The GNSS rovers 40 are constructed to receive the GNSS position-determination reference data 30 and use this data to determine rover erroneous position 43. The reference data 30 is not confidential and is available to any GNSS rover 40 with the construction to receive the signal. But only GNSS rovers 40 with subscriptions for confidential error keys are able to reverse (undo) some or all of the keyed intentional errors 24, 25 and 26 to determine subscribed rover positions 47. A frame signal 32 synchronizes the communication of the GNSS position-determination reference data 30 from the GNSS reference apparatus 20 to the GNSS rovers 40.

The GNSS reference apparatus 20 includes at least one GNSS reference receiver for receiving GNSS signals 14 from GNSS satellites 16. Each GNSS rover 40 also receives the GNSS signals 14 from the GNSS satellites 16. The reference apparatus 20 measures the carrier phases of the GNSS signals 14. The GNSS rovers 40 measure different carrier phases for the same GNSS signals 14 because they are at different locations. In the system 10 the GNSS reference apparatus 20 synthesizes erroneous carrier phases by inferring the carrier phases it measures to the reference erroneous position 23. The GNSS rovers 40 determine their rover erroneous positions 43 by double differencing reference and rover carrier phases for the GNSS signals 14 for the same GNSS satellites 16. Each GNSS rover 40 then applies the particular confidential error keys to which it has confidential access to reverse the corresponding set of keyed intentional errors 24, 25 and 26 to determine the subscribed rover position 47.

The GNSS position-determination reference data 30 from the GNSS apparatus 20 provides the reference position 21 and synthesized reference carrier phases that are inferred to the reference erroneous position 23. The GNSS rovers 40 use the reference position 21 and the synthetic (inferred) reference carrier phases to determine the rover erroneous position 43. Comparisons between the synthetic reference carrier phases and the rover carrier phase measurements yield estimates of perpendicular distance vectors between the GNSS rover 40 and the GPS satellite 16. Measurements from several GPS satellites 16 yield estimates of several perpendicular distance vectors and the rover erroneous position 43 of the GNSS rover 40.

The system 10 may be implemented as a real time kinematic (RTK) global positioning system (GNSS)-based system. The GNSS reference apparatus 20 includes one RTK GNSS reference receiver or a network of RTK GNSS reference signal receivers 50 having the effect of a GNSS reference receiver at the reference position 21. The intrinsic precision of the reference position 21 might have a maximum error of a few millimeters to a few centimeters. The GNSS rover 40 has an RTK GNSS receiver for measuring rover carrier phases at the rover position 41. Exemplary RTK GNSS systems are described in U.S. Pat. No. 5,519,620, entitled "centimeter accurate global positioning system receiver for on-the-fly real-time-kinematic measurement and control" by Nicholas C. Talbot et al. and U.S. Pat. No. 7,295,183 entitled "GPS reference system providing synthetic reference phases for controlling accuracy of high integrity positions" by Bird et al. which are incorporated herein by reference.

The RTK positioning system may be a virtual reference system (VRS) RTK GNSS-based system where several GNSS reference receivers in a network combine to effectively comprise the GNSS reference apparatus 20, and the GNSS rover 40 is a VRS RTK GNSS rover station. The reference receivers measure carrier phases of the GNSS signals 14 received from the GNSS satellites 16. The reference receivers in a network provide reference data for their measured phases and reference geographical positions to a server. Typically, one of the reference receivers is designated as a master reference station. The server and the master reference station may or may not be located together. The server communicates with one or more VRS RTK GNSS rover stations with a data communications signal. The server, or the server together with the VRS RTK GNSS rover station may determine the true reference position 21 as a virtual reference position that is located near to the rover position. The use of a network of reference stations instead of a single reference allows modeling of the systematic ionosphere and troposphere parametric errors in a region and thus provides the possibility of error reduction. Networks exist using public domain RTCM and CMR standards for bi-directional communication reference data to the rovers. Detailed information on the modeling of the errors is available in "Virtual Reference Station Systems" by Landau et al., published by the Journal of Global Positioning Systems for 2002, Vol. 1, No. 2 pages 137-143. The Roverkey signals 34A-E can include information for the approximate locations of the GNSS rovers 40A-E for RTK VRS processing and for orienting the x, y, z directions for the shapes for the error zones for the keyed intentional errors 24, 25 and 26 to the local North, East, Up directions for the GNSS rovers 40A-E.

FIG. 1A is a block diagram of the GNSS reference apparatus 20 having one or more GNSS reference signal receivers 50, one or more computer processors 52 and one or more devices for a memory 54. The memory 54 stores program instructions 56, 250 and 380. The processors 52 execute the instructions 56, 250 and 380 to operate the GNSS reference apparatus 20. The instructions 56 enable a user to access, program and control the GNSS reference apparatus 20. The instructions 250 direct the GNSS reference apparatus 20 to generate and issue GNSS position-determination reference data based on the reference erroneous position 23. The instructions 380 direct the GNSS reference apparatus 20 to issue the confidential error keys so that the GNSS rover 40 can compute a subscribed position 47. The GNSS signal receivers 50 receive the GNSS signals 14 from the GNSS satellites 16 and pass information based on measurements of these signals to the processors 52. The details of the instructions 250 and 380 are described in the detailed descriptions that accompany the figures of the block diagrams and flow charts of this disclosure.

FIG. 1B is a block diagram of the GNSS rover 40 having a GNSS rover signal receiver 60, one or more computer processors 62 and one or more devices for a memory 64. The memory 64 stores program instructions 66, 300 and 350. The processors 62 execute the instructions 66, 300 and 350 to operate the GNSS rover 40. The instructions 66 enable a user to operate and read from the GNSS rover 40. The instructions 300 direct the GNSS rover 40 to use the GNSS position-determination reference data and the subscribed confidential error keys to compute a subscribed position 47. The instructions 350 direct the GNSS rover 40 for confidential access to the subscribed confidential error keys. The GNSS rover signal receiver 60 receives the GNSS signals 14 from the GNSS satellites 16 and passes information based on measurements of these signals to the processors 62. The details of the instructions 300 and 350 are described in the detailed descriptions that accompany the figures of the block diagrams and flow charts of this disclosure. The processors 62 and the memory 64 may be located in different locations and are not necessarily located in the same location as the GNSS rover signal receiver 60. The devices for the memories 54 and 64 may be, but are not limited to, devices using optical, electrical, magnetic memory technologies or combinations of these technologies.

The system 10 with RTK uses highly accurate carrier phase measurements of GNSS signals in order to provide better position accuracy and high integrity. The GNSS rover 40 that is constructed for RTK operation can determine rover positions relative to reference positions to an accuracy of about a centimeter to a few tens of centimeters. The GNSS rover 40 uses two sets of carrier phase measurements. One set of measurements is made locally by the rover 40. The other set is made by a reference GPS receiver or is synthesized from a network of one or more reference GPS receivers in the GNSS reference apparatus 20. For each carrier phase measurement that is present in both sets, the difference is calculated. This phase difference combined with an unmeasured integer number of carrier cycles for that signal relates to the difference in measurement positions. The rover 40 attempts to determine the unmeasured integers. When one set of integers combined with several corresponding measurements leads to a unique rover position for the rover erroneous position 43, there is a high confidence in the integrity of the position 43 and the subscribed rover position 47.

Figure 2:
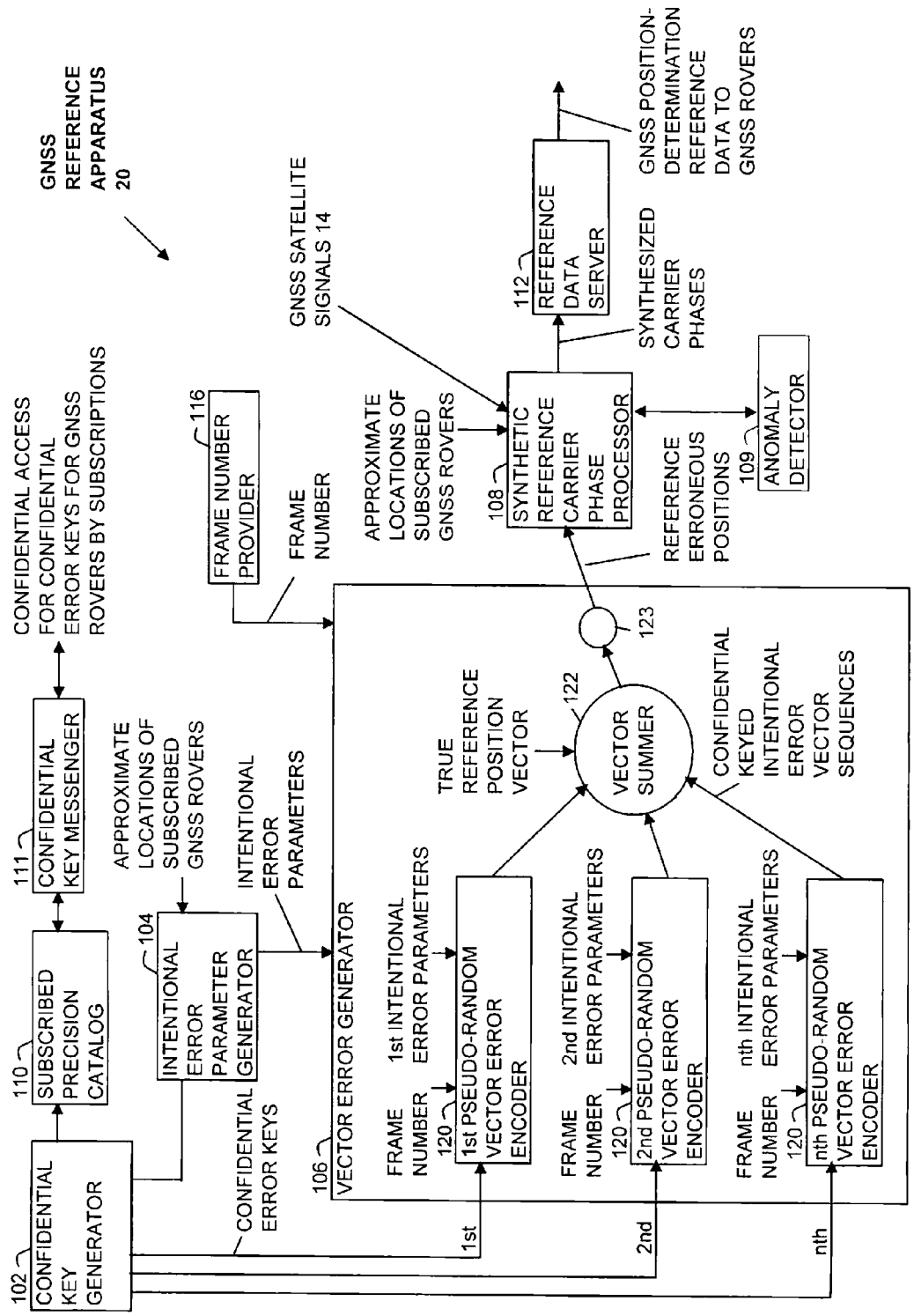
FIG. 2 is a block diagram of a GNSS reference apparatus for providing one or more subscribed precisions.

FIG. 2 is a block diagram of the GNSS reference apparatus 20 of the GNSS positioning system 10. The GNSS reference apparatus 20 includes a confidential key generator 102, an intentional error parameter generator 104, a vector error generator 106, a synthetic reference carrier phase processor 108, and a reference data server 112. The confidential key generator 102 uses a random irreversible process to generate 1st through nth confidential error keys. The process may use a random number generator or thermal noise or some other process so that the confidential error keys are very difficult to reproduce. The intentional error parameter generator 104 provides a subscribed precision with one or more of the 1st through nth intentional error parameter sets for each subscribed precision.

The 1st through nth intentional error parameter sets are associated with the 1st through nth random confidential error keys, respectively. The "n" is at least one but typically two or more. The intentional error parameters control and define error zones for the shapes and sizes of the sequences of keyed intentional errors 24, 25 and 26. The parameters can be specified in rectangular coordinates (X, Y and Z) in a global, nearly global, or local coordinate system. In a local coordinate system, the intentional error parameter set can be specified in ordinal (North, East, Up) coordinates, cylindrical coordinates (rho, R and H) or polar coordinates (rho, R and theta). The intentional error parameter generator 104 may have independent a, b, c parameters, some of which may be zero, to provide keyed intentional errors in a horizontal plane or vertical direction, or to provide a box, cylindrical or spherical shaped error zone of specified size depending on the chosen coordinate system and parameter values.

There may be more than one confidential error key and associated intentional error parameter set to provide a particular subscribed precision (illustrated in FIG. 4) for a particular subscription class of GNSS rovers 40. The vector error generator 106 uses the confidential error keys and the associated intentional error parameter sets to generate a three dimensional sequence of reference erroneous positions 23. The time epochs for the chips or units of the sequence might be one second or any other time period. The confidential key generator 102 connects with a subscribed precision catalog 110. The subscribed precision catalog 110 classifies the 1st through nth confidential error keys as subscribed or non-subscribed for each precision that is available by subscription to the GNSS rovers 40. The classification of the confidential error keys effectively signifies and designates the 1st through nth keyed intentional errors as either subscribed or non-subscribed for a particular subscribed precision for a subscription class of GNSS rovers 40. The subscribed precision catalog 110 passes the subscribed group of confidential error keys to a reference confidential key messenger 111. The confidential key messenger 111 communicates information for the subscribed confidential error keys in a confidential (secret) manner to a GNSS rover 40 that has a subscription for the subscribed precision. The confidential key messenger 111 allows or permits or enables confidential access for a subscribed GNSS rover 40 to receive the confidential error keys for which is has subscribed.

The synthetic reference carrier phase processor 108 determines the carrier phases of the GNSS signals 14 for the reference position 21. The processor 108 then uses the three dimensional angle to the GPS satellites 16 and the synthetic offset vectors 22 with the measured GNSS carrier phases to synthesize and infer the GNSS carrier phases for the reference erroneous position 23.

An anomaly detector 109 connects with the phase processor 108 to prevent outlier position errors in order to provide greater integrity to the determination of the rover erroneous position 43. The anomaly detector 109 determines a reference phase residual corresponding to a difference between a current and a previous difference between a reference phase measurement at a first reference network position and a reference phase measurement at a second reference network position and detects an anomaly when the phase residual exceeds a threshold corresponding to a selected outlier position integrity limit. When an anomaly is detected, the GNSS reference apparatus 20 provides an anomaly detection signal in the GNSS position-determination reference data 30 to the GNSS rover 40. The GNSS rover 40 may use the anomaly signal to provide a flag to inhibit the determination of the rover erroneous position 43 or the subscribed rover position 47, or to indicate that the subscribed rover position 47 may not be trustworthy.

The reference synthesized GNSS carrier phases are the carrier phases of the GNSS signals 14 that would be measured at the reference erroneous position 23. The reference data server 112 issues the reference position 21 and the inferred reference carrier phases in the reference data 30. The server 112 can be a radio to communicate with wireless signals or a connection into a public telephone network to communicate by posting and viewing from a web site or emails. The GNSS position-determination reference data 30 does not need to be confidential. A GNSS rover 40 with no subscription, illustrated with 40E, could receive and process the reference data 30 to determine the GNSS-based rover erroneous position 43. This rover position 43 has the non-subscribed error vector 42 of the same magnitude and the opposite direction as the synthetic offset vector 22.

The vector error generator 106 has 1st through nth pseudo-random vector error encoders 120 and a vector summer 122. The vector error encoders 120 use a frame number, the confidential error keys, and the intentional error parameters that are respectively associated with the confidential error keys to generate 1st through nth pseudo-random sequences of keyed intentional errors. The frame number is taken from a frame number provider 116 to synchronize epochs of pseudo-random sequences in the GNSS reference apparatus 20 and the GNSS rovers 40.

The vector sum of the keyed intentional errors shows as the synthetic offset vector 22 in FIG. 1. The vector summer 122 sums the vectors for 1st through nth pseudo-random sequences of keyed intentional errors with the vector for the reference position 21 to generate the sequence of reference erroneous positions 23. To sum the vectors, the vector summer 122 sums the x component of the reference position 21 with the x components of the 1st through nth keyed intentional error vectors for a total x error, sums the y component of the reference position 21 with the y component of the 1st through nth keyed intentional errors for a total y error, and sums z component of the reference position 21 with the z components of the 1st through nth keyed intentional errors for a total z error.

A new keyed intentional error in a sequence is generated in each epoch. The vector summer 122 adds the x, y, z coordinates in the 1st, 2nd and nth keyed intentional errors in a current epoch to determine the synthetic offset vector 22 in the x, y, z dimensions, respectively, and adds these x, y, z coordinates to the x, y, z coordinates, respectively, of the reference position 21 to generate the x, y, z coordinates, respectively, of the non-subscribed reference erroneous position 23. Alternatively, the vector summer 122 may add the x, y, z coordinates to the x, y, z coordinates, respectively, of the reference position 21 to determine the reference erroneous position 23 without the intermediate step of first determining x, y, z coordinates for the synthetic offset vector 22. A position spread filter 123 may be used to smooth and/or interpolate the sequence of synthetic offset vectors 22 or the sequence of reference erroneous positions 23.

Figure 3:
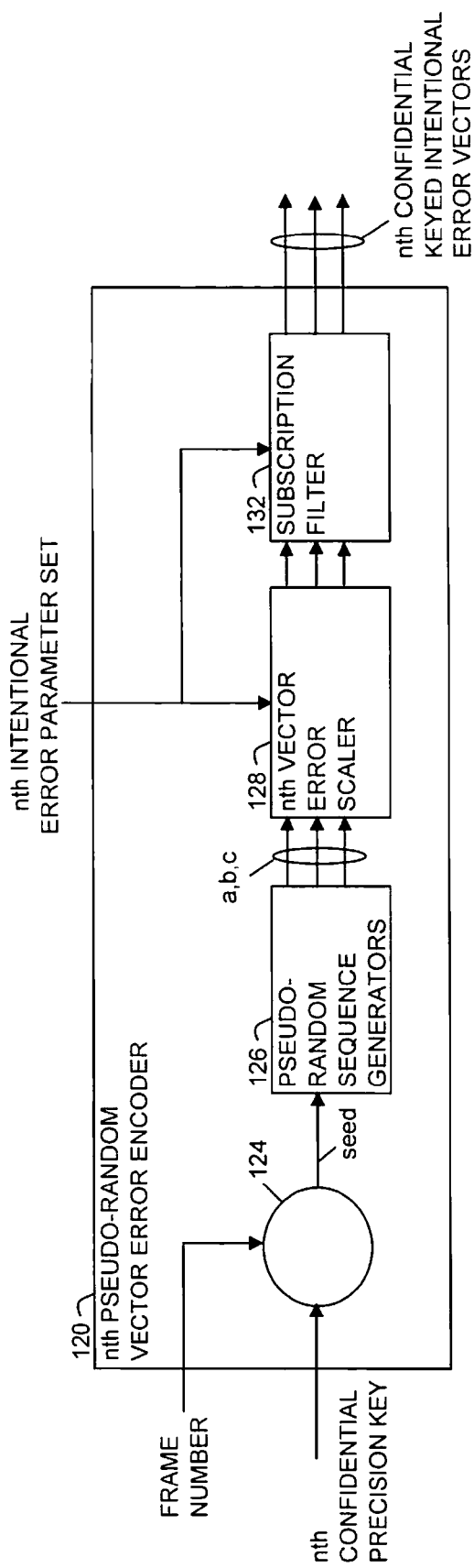
FIG. 3 is a block diagram of a vector error encoder for a GNSS reference apparatus.

FIG. 3 is a block diagram for the pseudo-random vector error encoder 120 in the GNSS reference apparatus 20. The vector error encoder 120 includes a confidential seed generator 124, one or more pseudo-random sequence generators 126, a vector error scaler 128, and a subscription filter 132. The seed generator 124 combines the confidential error key from the confidential key generator 102 with the frame number to generate a confidential seed. The combination for the confidential seed may be generated by concatenating the bits of the confidential error key with the bits of the frame number.

A frame has a time period such as an hour or a day. The pseudo-random sequences might have one second or one minute epochs. For a frame time of one day and an epoch of one minute there would be 1440 epochs in the frame. The frame number can be any arbitrary number determined periodically; and non-confidentially available in a frame signal 32 from the frame number provider 116. The public could see the frame number but it cannot recreate the confidential seed because the confidential error key is secret. Alternatively, the frame number provider 116 derives the frame number from a real time clock somewhere in the GNSS reference apparatus 20 and transmits the frame number in the frame signal 32. The frame number provider 116 may be located in a server that is not otherwise associated with the GNSS reference apparatus 20. Eavesdroppers can know the number, but it doesn't do them any good without the confidential error key.

The confidential error key might be changed for each zeroing of a frame counter in the frame number provider 116 or before any reuse of an arbitrary frame number. Otherwise, the number sequences from the pseudo-random sequence generators 126 will be reused. That is not fatal to the idea of confidentiality, but it increases the susceptibility of the confidential error key to brute force attack. The pseudo-random sequence generators 126 are restarted for every frame with a different confidential seed and for every frame they generate a confidential data frame with a different sequence. The benefit of generating the seed from a random confidential error key is that the pseudo-random sequence generators 126 generate random number sequences that are difficult to reproduce by a user without a copy of the confidential error key, but are easily reversible by a GNSS rover 40 that does have a copy of the confidential error key that it can get with a subscription. The nth vector error encoder 120 generates the nth keyed intentional error vector for each epoch of time. For example, 1200 epochs into a frame, the vector error encoder 120 has generated 1200 vectors.

The pseudo-random sequence generators 126 have an algorithm that is initiated with the confidential seed to generate confidential pseudo-random sequences. The pseudo-random sequences are confidential because the initial seed is confidential. But the confidential sequences can be reproduced by a GNSS rover 40 that has access to the non-confidential frame number, the algorithm which is not confidential, and the confidential error key which is only available by a private subscription.

The vector error encoder 120 has three pseudo-random sequence generators 126 to provide three confidential sequence components a, b and c to the vector error scaler 128. Each of the confidential sequences a, b and c is uniformly distributed over a range of −1 to +1. Before scaling, the "a", "b", and "c" confidential sequences are interchangeable. The vector error scaler 128 scales the confidential sequences a, b and c according to the intentional error parameters to provide coordinate values in orthogonal x, y and z dimensions for the error zones in space of the vector sequences of the keyed intentional errors. The intentional error parameter set includes a control parameter to configure the vector error scaler 128 for the shape of the zone of the errors and one or more parameters to define the size in each dimension. The shape may be a box, a cylinder or a sphere. A smaller intentional error parameter results in a smaller keyed intentional error (better precision) and a larger intentional error parameter results in a larger keyed intentional error (worse precision) for GNSS position-determination in the GNSS rover 40. The intentional error parameter sets may include filter parameters to provide individualized smoothing and spreading statistics to the vector sequences of keyed intentional error.

For a box (also known as a rectangular parallelepiped) shape, the intentional error parameters are X, Y and Z. The units of X, Y and Z are distances such as millimeters. FIG. 10A shows a configuration for the vector error scaler 128 to provide a box shape. The vector error scaler 128 multiplies the confidential sequences a, b and c by the parameters X, Y and Z to provide −X to +X, −Y to +Y and −Z to +Z, respectively, uniform distributions for coordinate values in rectangular or ordinal dimensions x, y and z.

For a cylindrical shape, the intentional error parameters are R (radius) and H (height) of the cylinder. The units of R and H are distances such as millimeters. FIG. 10B shows a configuration for the vector error scaler 128 to provide a cylindrical shape. The vector error scaler 128 converts the "a" confidential sequence into a sequence of rho angles ($\rho$) for the cylinder with a uniform distribution of +180 to −180 degrees. The vector error scaler 128 multiplies the "b" confidential sequence by the parameter R and a sequence for $\cos(\rho)$ to provide +R $\cos(\rho)$ to −R $\cos(\rho)$ error boundaries for coordinate values in the x dimension and multiplies the "b" confidential sequence by the parameter R by a sequence for $\sin(\rho)$ to provide +R $\sin(\rho)$ to −R $\sin(\rho)$ error boundaries for coordinate values in the y dimension. The vector error scaler 128 multiplies the "c" confidential sequence by the parameter H to provide −H to +H error boundaries for coordinate values in the z dimension.

For a spherical shape, the intentional error parameter is R (radius) of the sphere. The units of R are distance such as a millimeters. FIG. 10C shows a configuration for the vector error scaler 128 to provide a spherical shape. The vector error scaler 128 converts the "a" confidential sequence into a sequence of rho angles (ρ) with a uniform distribution of +180 to −180 degrees of the sphere and converts the "c" confidential sequence into a sequence of theta angles (θ) with a uniform distribution of +90 to −90 degrees for the sphere. The vector error scaler 128 multiplies the "b" confidential sequence by the parameter R and a sequence for cos(ρ) and a sequence for cos(θ) to provide +R cos(ρ)cos(θ) to −R cos(ρ) cos(θ) error boundaries for coordinate values in the x dimension. The vector error scaler 128 multiplies the "b" confidential sequence by the parameter R and a sequence for sin(ρ) and a sequence for cos(θ) to provide +R sin(Σ)cos(θ) to −R sin(ρ)cos(θ) error boundaries for coordinate values in the y dimension. The vector error scaler 128 multiplies the "b" confidential sequence by the parameter R and a sequence for sin(θ) to provide +R sin(θ) to −R sin(θ) error boundaries for coordinate values in the z dimension.

Coming from the vector error scalers 128, the vectors of keyed intentional errors are randomly and uniformly distributed in a spatial volume having a size and shape confined within peak-to-peak error boundaries (illustrated in FIG. 4) defined by the intentional error parameters. The 1st through nth subscription filters 132 spread the vectors for the 1st through nth vector sequences of keyed intentional errors, respectively, in distributions for error zones having statistical characteristics that correspond to the error boundaries. The combination of the subscription filters 132 and the position spread filter 123 smoothes and/or interpolates the reference erroneous position sequence so that carrier phase positioning will not have discontinuities. In one embodiment the filtering averages the last 100 (or some other number) epochs for the sequences of the keyed intentional errors. Filter parameters can be included in the respective intentional error parameter sets for independent control of the 1st through nth subscription filters 132 to define distribution statistics for the 1st through nth keyed intentional errors. Each of the x, y, z dimensions can be filtered independently.

The subscription filters 132 may be linear or non-linear. The position spread filter 123 is linear. The sequential vectors of keyed intentional errors are filtered with the filters 123 and 132 to provide a distribution with an error zone having a selected number of standard deviations at the error boundaries. In another example, the subscription filter 132 may have a linear part and a non-linear part. The linear part provides a smooth distribution where the majority (for example a percentage between 70% to 95%) of the vectors are within the error boundaries but the largest vectors are outside the error boundaries. The non-linear part applies a non-linear gain factor to subtract the largest vectors from the error boundaries to fold back or reflect the vectors from the error boundaries. The effect of the fold back is to confine the spread of the keyed intentional errors to hard limits at the error boundaries.

Figure 4:
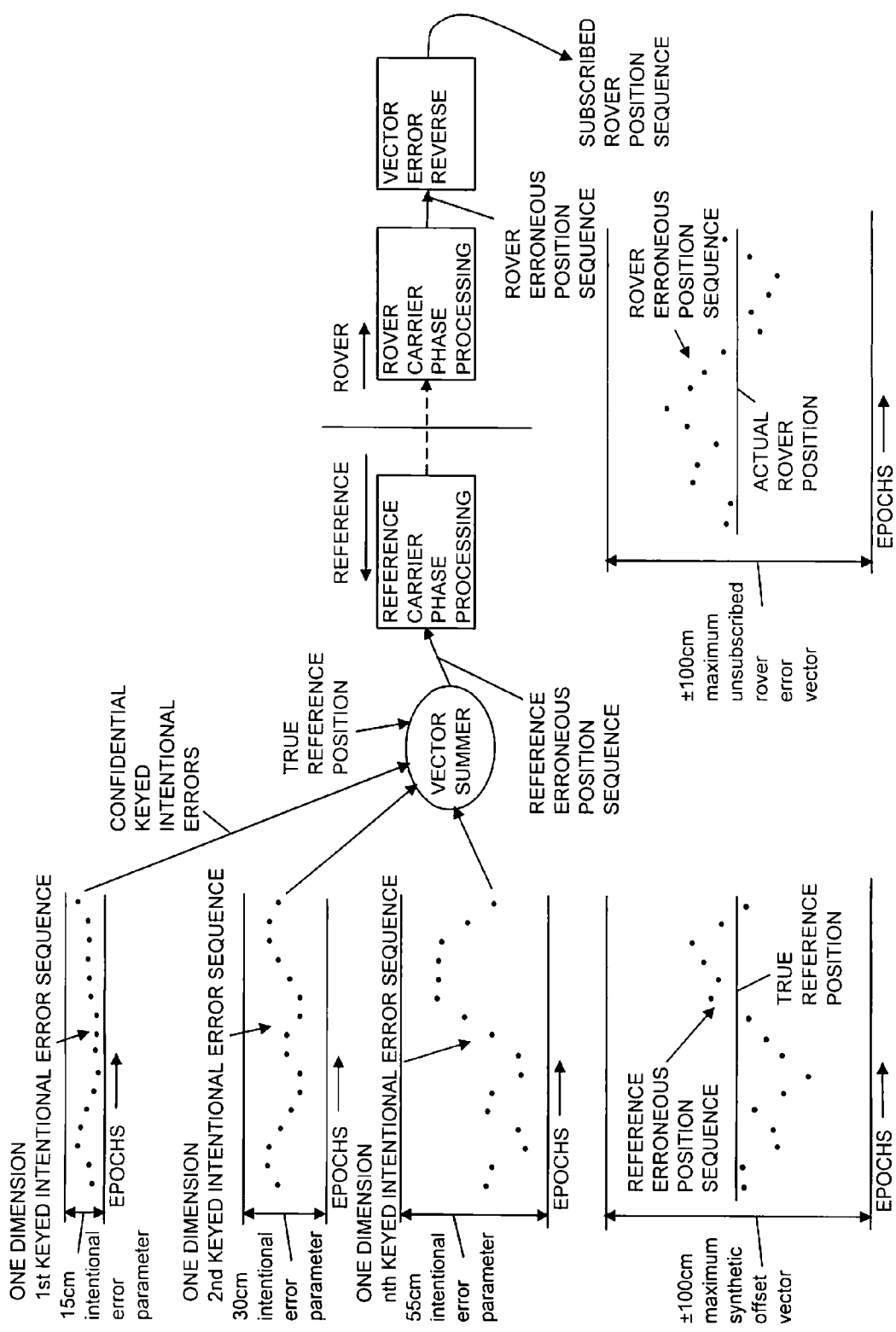
FIG. 4 is an illustration of exemplary keyed intentional errors for the system.

FIG. 4 illustrates pseudo-random keyed intentional error sequences. The pseudo-random 1st, 2nd and nth keyed intentional error sequences are scaled by 1st, 2nd and nth intentional error parameter sets in sequential epochs. Only one dimension is shown in order to make the illustration easier to understand. As an example, 1st, 2nd and nth intentional error parameters are 15 centimeters, 30 centimeters and 55 centimeters to provide 1st, 2nd and nth keyed intentional error sequences having uniform distributions with error boundaries and maximum errors of ±15 centimeters, ±30 centimeters and ±55 centimeters, respectively. All the keyed intentional error sequences are summed at each epoch with the reference position 21 to generate the sequence of reference erroneous positions 23. In the illustration 15+30+55=100 centimeters of maximum intentional error for the synthetic offset vector 22 with respect to the reference position 21. Synthetic reference carrier phases for the GNSS signals 14 are inferred to the reference erroneous position 23 and synthesized for each epoch.

The GNSS reference apparatus 20 provides the synthetic reference carrier phases to the GNSS rovers 40 in the reference data signal 30. The GNSS rovers 40 process the synthetic reference carrier phases with the carrier phases measured by the GNSS rovers 40 from the GNSS signals 14 to determine the sequence of rover erroneous positions 23. The sequence of rover erroneous positions 43 have the non-subscribed error vectors 42 with ±100 centimeters of error boundary for the maximum intentional error with respect to the true rover position 41. A particular GNSS rover 40 reverses a particular combination of keyed intentional errors depending upon the particular combination of confidential error keys to which it has access to provide a sequence of subscribed rover positions 47 with the restricted precision for which it has subscribed.

The confidential error keys, intentional error parameter sets, and confidential keyed intentional error sequences are classified as subscribed or non-subscribed for a subscribed (restricted) precision. A subscription class for the subscribed precision is enabled by one or more subscribed confidential error keys associated with one or more subscribed intentional error parameter sets and further associated with one or more subscribed confidential keyed intentional error sequences. The subscribed keyed intentional errors are reversed in a GNSS rover 40 having a subscription for a subscribed precision. Therefore, the subscribed precision is determined by the combination of non-subscribed confidential keyed intentional error sequences.

FIG. 4A is an exemplary table for subscription classifications (classes) of GNSS rovers 40 corresponding to subscribed precisions. In general the GNSS rovers 40 are able to reverse some but not all of the confidential keyed intentional errors in the reference erroneous position 23. The intentional error parameters and the confidential keyed intentional error sequences associated with the subscribed confidential error keys are classified as subscribed. The subscribed precisions in the GNSS rovers 40 are determined by the confidential keyed intentional errors that are NOT reversible in the particular GNSS rover 40. The 1st through 8th GNSS rovers 40 represent subscription classes.

Rover #1 has no confidential error keys so none of the keyed intentional errors are reversed. All of the 1st, 2nd and nth intentional error parameters of 15, 30 and 55 centimeters are applied. 1st, 2nd and nth keyed intentional errors of ±15, ±30 and ±55 centimeters combine for a subscribed maximum error with an error boundary of ±100 centimeters. The rover #1 in this illustration corresponds to the GNSS rover 40E of FIG.

Rover #2 has the 1st confidential error key so the 1st keyed intentional error of ±15 is reversed. The 2nd and nth intentional error parameters of 30 and 55 centimeters are applied. The 2nd and nth keyed intentional errors of ±30 and ±55 centimeters combine for a subscribed maximum error with an error boundary of ±85 centimeters.

Rover #3 has the 2nd confidential error key so the 2nd keyed intentional error of ±30 centimeters is reversed. The 1st and nth intentional error parameters of 15 and 55 centimeters are applied. The 1st and nth keyed intentional errors of ±15 and ±55 centimeters combine for a maximum error with an error boundary of ±70 centimeters.

Rover #4 has the 1st and 2nd confidential error keys so the 1st and 2nd keyed intentional errors of ±15 and ±30 centimeters are reversed. The nth intentional parameter of 55 centimeters is applied for a subscribed maximum error with an error boundary of ±55 centimeters. The rover #4 corresponds to the GNSS rover 40D.

Rover #5 has the nth confidential error key so the nth keyed intentional errors of ±55 centimeters is reversed. The 1st and 2nd intentional error parameters of 15 and 30 centimeters are applied. The 1st and 2nd keyed intentional errors of ±15 and ±30 centimeters combine for a subscribed maximum error with an error boundary of ±45 centimeters. The rover #5 corresponds to the GNSS rover 40C.

Rover #6 has the 1st and nth confidential error keys so the 1st and nth keyed intentional errors of ±15 and ±55 centimeters are reversed. The 2nd intentional error parameters of 30 centimeters is applied for a subscribed maximum error with an error boundary of ±30 centimeters.

Rover #7 has the 2nd and nth confidential error keys so the 2nd and nth keyed intentional errors of ±30 and ±55 centimeters are reversed. The 1st intentional error parameter of 15 centimeters is applied for a subscribed maximum error with an error boundary of ±15 centimeters. The rover #7 corresponds to the GNSS rover 40B.

Rover #8 has the 1st, 2nd and nth keys so all the 1st, 2nd and nth keyed intentional errors of ±15, ±30 and ±55 centimeters are reversed. No intentional error is added to the intrinsic precision of the system 10. None of 1st, 2nd and nth intentional error parameters of 15, 30 and 55 centimeters are applied. The rover #8 corresponds to the GNSS rover 40A.

Figure 5:
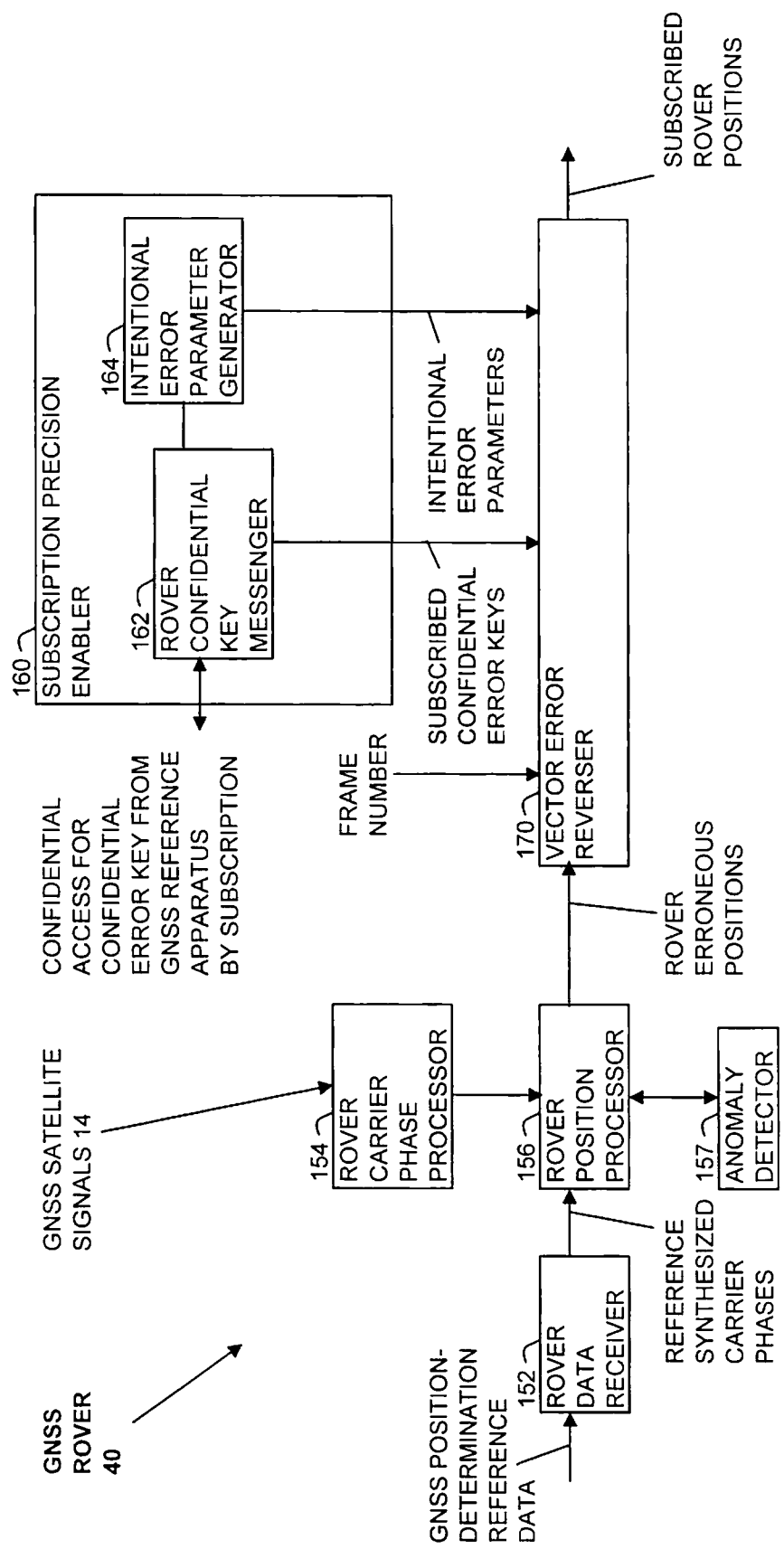
FIG. 5 is a block diagram of a GNSS rover for determining a subscribed precision.

FIG. 5 is a block diagram of a GNSS rover 40 that provides the subscribed rover position 47 at a subscribed precision by reversing keyed intentional errors in the reference erroneous position 43. The GNSS rover 40 includes a rover data receiver 152, a rover carrier phase processor 154, a rover position processor 156, a subscription precision enabler 160, and a vector error reverser 170. The rover data receiver 152 receives GNSS position-determination reference data 30 from the GNSS reference apparatus 20. The GNSS position-determination reference data 30 includes data for the true reference position 21 and the synthesized reference carrier phases that are inferred to the reference erroneous position 23. The rover carrier phase processor 154 determines rover carrier phases for the GNSS signals 14. The rover position processor 156 uses the reference position 21 and compares the synthetic reference carrier phases and the rover carrier phases for the same GNSS satellites 16 to determine a rover erroneous position 43 corresponding to the reference erroneous position 23.

An anomaly detector 157 provides integrity for the rover erroneous position 43, and therefore also the subscribed rover position 47, by detecting an anomaly signal in the reference data 30 from the GNSS reference apparatus 20 and testing phase residuals of the rover carrier phases against an integrity limit. The anomaly signal or the rover carrier phase anomaly warns the GNSS rover 40 that the synthetic reference carrier phases or the rover carrier phases represent a position that is outside a selected integrity limit. The GNSS rover 40 can use the anomaly signal to flag or inhibit the determination of the rover erroneous position 43 and the subscribed rover position 47. The subscription precision enabler 160 has confidential access to receive the confidential error keys to which it has subscribed from the operator of the GNSS reference apparatus 20 that provides the GNSS position-determination reference data.

The subscription precision enabler 160 includes a rover confidential key messenger 162 and an intentional error parameter generator 164. The confidential key messenger 162 communicates in a confidential manner with the GNSS reference apparatus 20 to get access to one or more subscribed confidential error keys. The intentional error parameter generator 164 has or receives data to associate the subscribed confidential error keys with intentional error parameter sets. There may be more than one subscribed confidential error key and associated intentional error parameter set to provide a particular subscribed precision to a particular GNSS rover 40 (see (FIGS. 4 and 4A). A particular GNSS rover 40 might have any or all of the 1st through nth confidential error keys for 1st through nth intentional error parameter sets, respectively, that are generated in the GNSS reference apparatus 20. The GNSS rover 40 may also be constructed as illustrated in 40E so that none of the keyed intentional errors are reversed. The subscribed precision can be specified in Cartesian coordinates (x, y and z) or ordinal coordinates (North, East, Up) or polar coordinates (rho, R and theta) or some other coordinate system. A coordinate converter 165 may be required to convert selected precisions to Cartesian coordinates.

The vector error reverser 170 uses the particular confidential error keys to which it has confidential access with a frame number from the frame number provider 116 and the intentional error parameter sets to reproduce the pseudo-random sequences of particular keyed intentional errors, respectively, in the reference erroneous position 23. The vector error reverser 170 sums the reproduced keyed intentional errors with the rover erroneous position 43 to determine the subscribed rover position 47.

Figure 6:
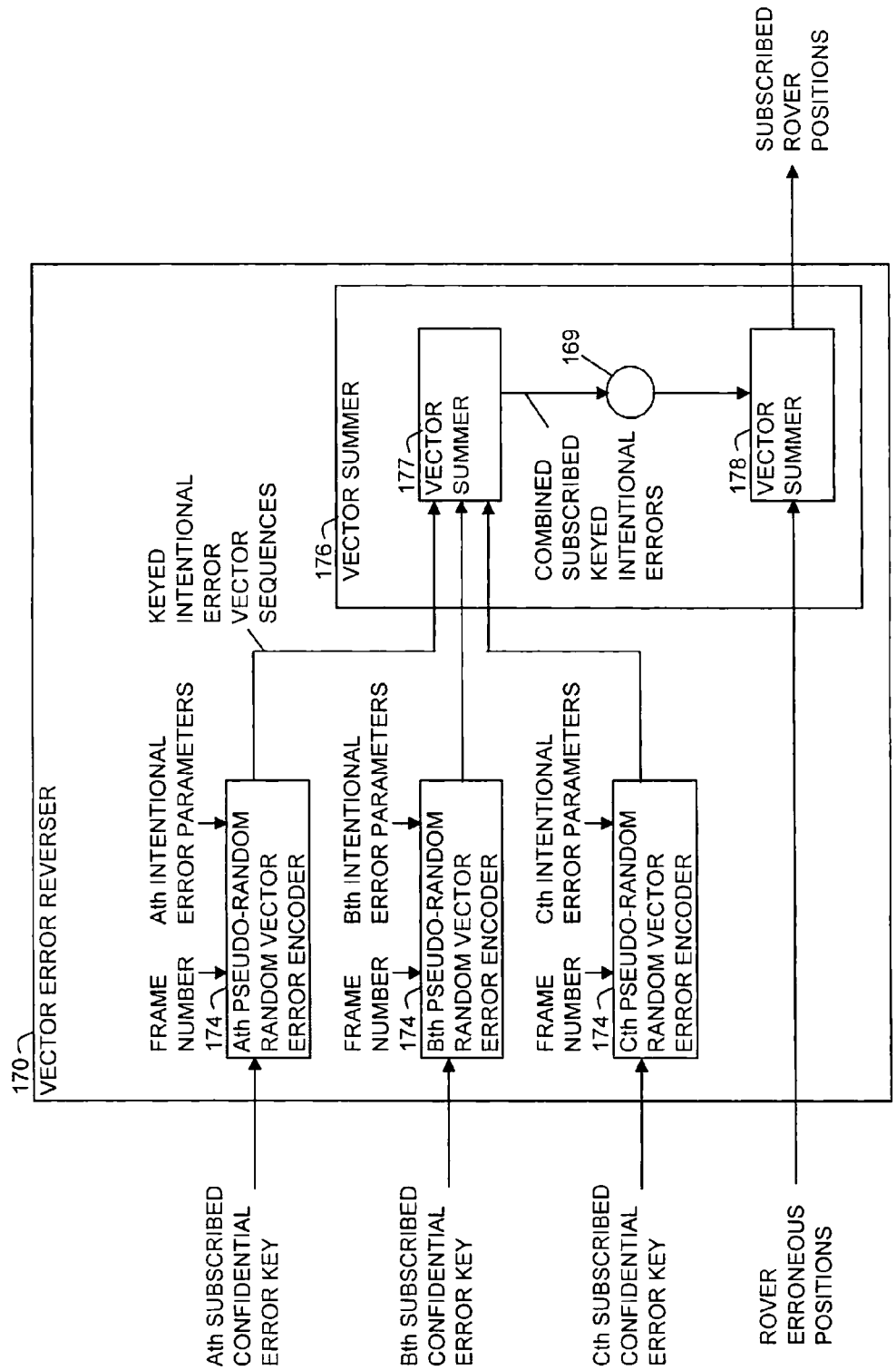
FIG. 6 is a block diagram of a vector error reverser for a GNSS rover.

FIG. 6 is a block diagram of the vector error reverser 170. The vector error reverser 170 includes Ath, Bth and Cth pseudo-random vector error encoders 174, and a vector summer 176. The vector error encoders 174 use the frame number, and Ath, Bth and Cth subscribed confidential error keys and associated intentional error parameter sets to reproduce Ath, Bth and Cth pseudo-random sequences of keyed intentional errors. The Ath, Bth and Cth keyed intentional error sequences may be a subset of the 1 through nth confidential error keys in the GNSS reference apparatus 20. In general the intentional error parameter sets are three dimensional. The operation of the vector error encoders 174 corresponds to the operation of the vector error encoders 120 in the GNSS reference apparatus 20 so that the same confidential error keys, frame numbers and pseudo-random sequence algorithms that are used to reproduce the keyed intentional errors in the GNSS rovers 40 that were used to generate the keyed intentional errors in the GNSS reference apparatus 20.

The designations Ath, Bth and Cth are used to indicate that the particular GNSS rover 40 has subscribed confidential access to some, not limited to three, but not necessarily all of the 1st through nth confidential error keys used by the reference apparatus 20 so it will be able to reverse some but not all of the keyed intentional errors in the rover erroneous position 43. The frame number is taken from a frame number provider 116 to synchronize epochs of pseudo-random sequences to the pseudo-random sequences in the GNSS reference apparatus 20.

The vector summer 176 includes a summer 177 and a summer 178. The summer 177 adds the vectors for Ath, Bth and Cth pseudo-random sequences of keyed intentional errors to which the GNSS rover 40 has access to generate combined keyed intentional error sequences. A position spread filter 169 smoothes and/or interpolates the combined keyed intentional error sequences to match and reverse the effect of the sequence filtering of the position spread filter 123 in the GNSS reference apparatus 20. To sum the vectors, the vector summer 176 sums the x components of the Ath, Bth and Cth keyed intentional error vectors for a combined x error, sums the y components of the Ath, Bth and Cth keyed intentional errors for a combined y error, and sums z components of the Ath, Bth and Cth keyed intentional errors for a combined z error. The summer 178 sums the combined x components from the x component of the rover erroneous position 43, sums the combined y components from the y component of the rover erroneous position 43, and sums the combined z components from the rover erroneous position 43 to compute x, y, z of the subscribed rover position 47. The summer 177 and the summer 178 may be combined into a single operation to sum the Ath, Bth and Cth keyed intentional errors with the rover erroneous position 43.

Figure 7:
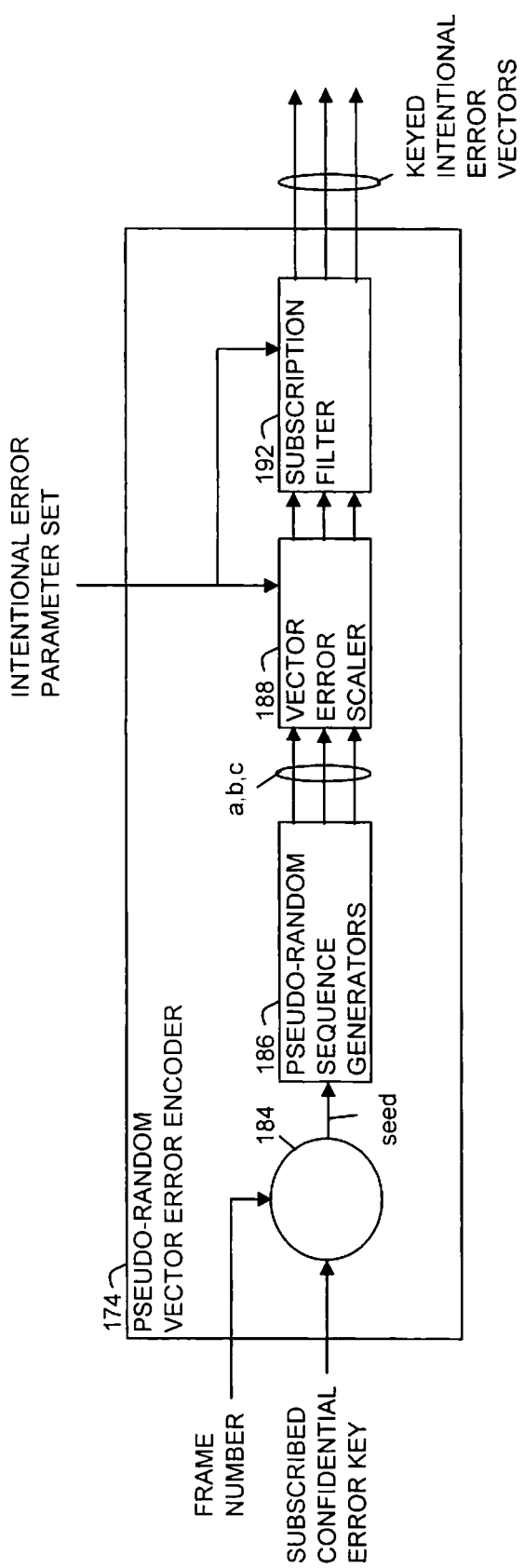
FIG. 7 is a block diagram of a vector error encoder in a GNSS rover.

FIG. 7 is a block diagram of one of the pseudo-random vector error encoders 174. The vector error encoders 174 reproduce the pseudo-random sequences of keyed intentional errors computed in the GNSS reference apparatus 20 when and only when the GNSS rover 40 has the corresponding confidential error key. Each vector error encoder 174 includes a confidential seed generator 184, one or more pseudo-random sequence generators 186, a vector error scaler 188, and a subscription filter 192. The seed generator 184 combines the confidential error key from the confidential key messenger 162 with the frame number to generate a confidential seed. The combination for the confidential seed may be generated by concatenating the bits of the confidential error key with the bits of the frame number.

A frame has a time period such as an hour or a day. The pseudo-random sequences might have one second or one minute epochs. For a frame time of one day and an epoch of one minute there would be 1440 epochs in the frame. The frame number can be any arbitrary number determined periodically; and non-confidentially available in the frame signal 32 from the frame number provider 116. The public can see the frame number but it cannot recreate the confidential seed because the confidential error key is secret. Alternatively, the frame number provider 116 derives the frame number from a real time clock. Eavesdroppers can know the number, but it doesn't do them any good without the confidential seed.

The confidential error key should be changed for each zeroing of a frame counter in the frame number provider 116 or before any reuse of an arbitrary frame number. Otherwise, the number sequences from the pseudo-random sequence generators 186 will be reused. That is not fatal to the idea of confidentiality, but it increases the susceptibility of the confidential error key to brute force attack. The pseudo-random sequence generators 186 are restarted for every frame with a different confidential seed and for every frame they generate a confidential data frame with a different sequence. The benefit of generating the seed from a random confidential error key is that the pseudo-random sequence generators 186 generate random number sequences that are difficult to reverse by a non-subscribed user without a copy of the confidential error key, but are easily reproducible by a GNSS rover 40 that does have a copy of the confidential error key that it can get with a subscription.

The vector error encoder 174 reproduces the keyed intentional error vector for each epoch of time. For example, 1200 epochs into a frame, the vector error encoder 174 has generated 1200 vectors. The pseudo-random sequence generator 186 has the same algorithm as the pseudo-random sequence generators 126 in the GNSS reference apparatus 20. If the subscribed GNSS rover 40 first turns on at the 1200th epoch, it will have to seed its pseudo-random sequence generators 186 with its confidential error key and the proper frame count and then cycle through 1200 epochs to synchronize to a sequence of keyed intentional error vector errors it reproduces. This can be done typically in less than one second as this cycle time can be much faster than the epoch time.

The pseudo-random sequence generators 186 have an algorithm using feedback that is initiated with the confidential seed to generate confidential pseudo-random sequences. The pseudo-random sequences are confidential because the initial seed is confidential. But the confidential sequences can be reproduced by a GNSS rover 40 that has access to the non-confidential frame number, the algorithm which is publically available (not confidential), and the same confidential error key which is only available by a private subscription.

The vector error encoder 174 has three pseudo-random sequence generators 186 to provide three confidential sequence components a, b and c to the vector error scaler 188. Each of the confidential sequences a, b and c is uniformly distributed over a range of −1 to +1. Before scaling, the "a", "b", and "c" confidential sequences are interchangeable. The vector error scaler 188 scales the confidential sequences a, b and c to provide coordinate values in orthogonal x, y and z dimensions of the vector sequences of the particular ones of the keyed intentional errors 24, 25 and 26 that are reversed for a subscribed precision. The shape and size of the zone in space of the coordinate values in orthogonal x, y and z are defined by the intentional error parameters. The particular intentional error parameters associated with the particular subscribed keyed intentional errors 24, 25 and 26 provide the shapes and sizes for the spread (error zone) of the vector sequences of keyed intentional errors for which the GNSS rover 40 has subscribed. The intentional error parameter set includes a control parameter to configure the vector error scaler 188 for the shape of the error zone and one or more parameters to provide the size of the error zone in each dimension. The shape may be a box, a cylinder or a sphere. A smaller keyed intentional error parameter reproduces a smaller keyed intentional error and a larger intentional error parameter reproduces a larger keyed intentional error for subscribed GNSS position-determination in the GNSS rover 40.

For a box shape (also known as a rectangular parallelepiped) the intentional error parameters are X, Y and Z. The units of X, Y and Z are distances such as millimeters. FIG. 10A shows a configuration for the vector error scaler 188 to provide a box shape for the keyed intentional errors. The vector error scaler 188 multiplies the confidential sequences a, b and c by the parameters X, Y and Z to provide −X to +X, −Y to +Y and −Z +Z uniform distributions of coordinates values in rectangular, ordinal dimensions x, y and z.

For a cylindrical shape, the intentional error parameters are R (radius) and H (height) of the cylinder. The units of R and H are distances such as millimeters. FIG. 10B shows a configuration for the vector error scaler 188 to provide a cylindrical shape for the keyed intentional errors. The vector error scaler 188 converts the "a" confidential sequence into a sequence of rho angles ($\rho$) for the cylinder with a uniform distribution of +180 to −180 degrees. The vector error scaler 188 multiplies the "b" confidential sequence by the parameter R and a sequence for $\cos(\rho)$ to provide +R $\cos(\rho)$ to −R $\cos(\rho)$ error boundaries for coordinate values in the x dimension and multiplies the parameter R by the "b" confidential sequence and a sequence for $\sin(\rho)$ to provide +R $\sin(\rho)$ to −R $\sin(\rho)$ error boundaries for coordinate values in the y dimension. The vector error scaler 188 multiplies the parameter H by the "c" confidential sequence to provide −H to +H coordinate values for error boundaries in the z dimension.

For a spherical shape, the intentional error parameter is R (radius) of the sphere. The units of R are distance such as a millimeters. FIG. 10C shows a configuration for the vector error scaler 188 to provide a spherical shape for the keyed intentional errors. The vector error scaler 188 converts the "a" confidential sequence into rho ($\rho$) angles with a uniform distribution of +180 to −180 degrees for the sphere and converts the "c" confidential sequence to an orthogonal angle theta (θ) with a uniform distribution of +90 to −90 degrees for the sphere. The vector error scaler 188 multiplies the "b" confidential sequence by the parameter R and a sequence for cos(ρ) and a sequence for cos(θ) to provide +R cos(ρ)cos(θ) to −R cos(ρ)cos(θ) error boundaries for coordinate values in the x dimension. The vector error scaler 188 multiplies the "b" confidential sequence by the parameter R and a sequence for sin(ρ) and a sequence for cos(θ) to provide +R sin(ρ)cos(θ) to −R sin(ρ)cos(θ) error boundaries for coordinate values in the y dimension. The vector error scaler 188 multiplies the "b" confidential sequence by the parameter R and a sequence for sin(θ) to provide +R sin(θ) to −R sin(θ) error boundaries for coordinate values in the z dimension.

The position spread filter 169 and the subscription filter 192 are designed to reverse the effects of the filtering that is applied by the GNSS reference apparatus 20 from the position spread filter 123 and the subscription filter 132, respectively. The position spread filter 169 filters the sequential vectors of the rover erroneous positions 43. In the rover erroneous positions 43 all the keyed intentional errors (FIG. 1 shows three vectors 24, 25 and 26 but there may be 10's or more vectors) of the system 10 are combined. Ath through Cth subscription filters 192 respectively filter the sequences of the Ath through Cth keyed intentional error sequences that are subscribed. The combination of the filters 169 and 192 is designed to reproduce the smoothing and/or interpolating that is applied by the GNSS reference apparatus 20. In one embodiment the filtering averages the last 100 (or some other number) epochs for the sequences of keyed intentional errors. Filter parameters can be included in the respective intentional error parameter sets for independent control of the Ath through Cth subscription filters 192 to separately define independent distribution statistics for the Ath through Cth keyed intentional errors. Each of the x, y, z dimensions can be filtered independently.

Coming from the vector error scalers 188, the vectors of the subscribed Ath through Cth keyed intentional errors are randomly and uniformly distributed in spatial volumes having sizes and shapes confined within peak-to-peak error boundaries defined by the Ath through Cth intentional error parameter sets. The Ath through Cth subscription filters 192 spread the vectors for the Ath through Cth keyed intentional errors to reproduce the distributions created in the GNSS reference apparatus 20. The distributions have error zones having statistical characteristics that correspond to the sizes and shapes of the error boundaries. The subscription filters 192 may be linear or non-linear. The position spread filter 169 is linear. The sequential vectors of keyed intentional errors may be filtered to provide a distribution for an error zone having a selected number of standard deviations at the error boundaries. In another example, the subscription filter 192 may have a linear filter part and a non-linear part. The linear part provides a smooth distribution where the majority (for example a percentage between 70% to 95%) of the vectors are within the error boundaries but the largest vectors are outside the error boundaries. The non-linear part applies a non-linear gain factor to subtract the largest vectors from the error boundaries. This folds back or reflects the vectors from the error boundaries having the effect that the spread is confined to hard limits at the error boundaries.

Figure 8:
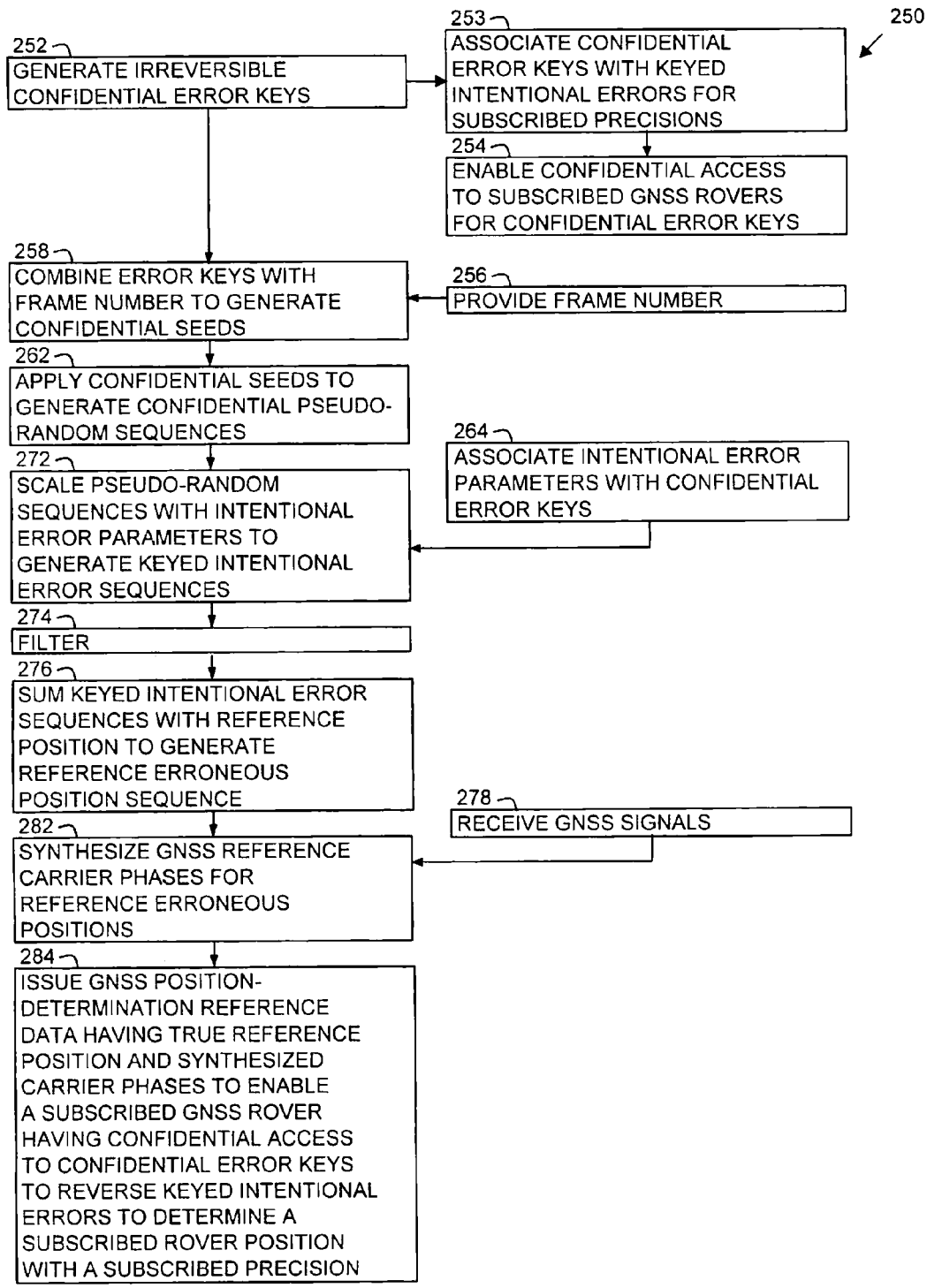
FIG. 8 is a flow chart of a method in a GNSS reference apparatus that adds keyed intentional errors to a reference position for providing GNSS reference data for subscribed precisions.

FIG. 8 is a flow chart of steps of a method in a GNSS reference apparatus for providing subscribed precisions. The steps can be implemented with program instructions 250 stored in one or more tangible non-transitory memories 54 and executed by one or more computer processors to direct the operation of the GNSS reference apparatus 20.

In step 252 the GNSS reference apparatus uses a random process to generate one or more irreversible confidential error keys. In step 253 the confidential error keys and the corresponding keyed intentional errors are associated. The confidential error keys and the corresponding keyed intentional errors classified as subscribed or non-subscribed according to subscriptions for subscribed precisions for particular GNSS rovers. The maximum positional error in the subscribed precision for each GNSS rover depends on the non-subscribed keyed intentional errors for that GNSS rover. In step 254 the GNSS reference apparatus and the subscribed GNSS rovers cooperate to enable confidential access. The confidential access with the particular subscribed GNSS rovers is used to transmit the subscribed confidential error keys. In step 256 the GNSS reference apparatus generates a frame number or obtains the frame number from another source. The frame number is not confidential. In step 258 the frame number is combined with the one or more confidential error keys to generate one or more confidential seeds. In step 262 pseudo-random sequences are generated that are made confidential by applying the confidential seeds to initiate pseudo-random sequence algorithms. Three confidential pseudo-random sequences are generated from one confidential seed for three dimensional vectors.

In step 264 the intentional error parameter sets are associated on one-to-one basis with the confidential error keys. In step 272 the confidential pseudo-random sequence vectors are scaled with or multiplied by the intentional error parameter vector set to generate confidential pseudo-random keyed intentional error vector sequences. The scaling operation sets the full scale, maximum, peak-to-peak value of the keyed intentional errors. In step 274 the vector sequences are smoothed by filtering. The filtering may provide interpolation and/or control the distributions of the vectors in spreads for the keyed intentional errors. In step 276 the true reference position x, y, z vector is added to the keyed intentional error x, y, z vector sequence to generate the reference erroneous position x, y, z vector sequence.

In step 278 the reference apparatus receives GNSS signals. In step 282 GNSS signal carrier phases are measured and then inferred to the reference erroneous position to provide the synthesized reference carrier phases. In the step 282, phase residuals are determined for the measured carrier phases in order to verify the integrity of the measurements and to test for anomalies and multipath errors. Finally, in step 284 the reference apparatus issues GNSS position-determination reference data having reference carrier phases that are synthesized for each epoch of the pseudo-random sequence of the reference erroneous positions. The configuration of the pseudo-random sequence enables a GNSS rover with confidential access to subscribed confidential error keys to reproduce the pseudo-random sequence and reverse the subscribed keyed intentional errors in order to determine a subscribed rover position with a subscribed precision.

Figure 9:
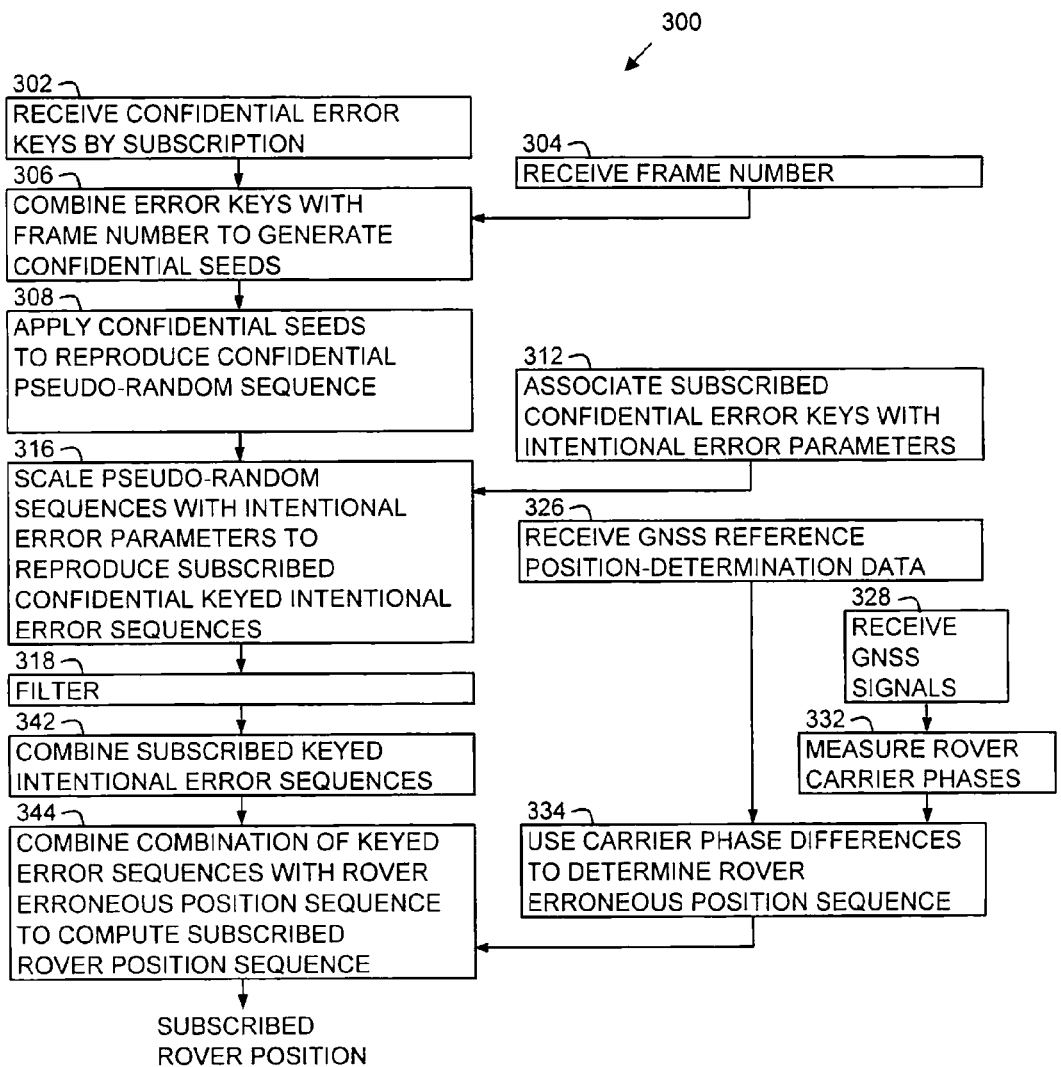
FIG. 9 is a flow chart of a method in a GNSS rover for providing a rover position with a subscribed precision by reversing keyed intentional errors in GNSS reference data.

FIG. 9 is a flow chart of steps of a method in a GNSS rover for a rover position with a subscribed precision. The steps can be implemented with program instructions 300 stored in one or more tangible non-transitory memories 64 and executed by one or more computer processors to direct the operation of the GNSS rover 40.

In step 302 the GNSS rover 40 receives the particular one or more confidential error keys for the precision for which it has subscribed. In step 304 the GNSS rover 40 receives a non-confidential frame number from the GNSS reference apparatus 20 or from a source that provides the frame number to the GNSS reference apparatus 20. In step 306 the one or more subscribed confidential error keys are combined with the frame number to generate one or more confidential seeds, respectively.

In step 308 confidential pseudo-random sequences are generated by applying the confidential seeds to initiate pseudo-random sequence algorithms. Three confidential pseudo-random sequences are generated from one confidential seed for three dimensional vectors. The confidential sequences are reproduced versions of the confidential sequences that are generated in the reference apparatus 20 from the same confidential seeds based on the same subscribed confidential error keys and non-confidential frame numbers. In step 312 intentional error parameter sets are designated that are associated with the subscribed confidential error keys. In step 316 the confidential pseudo-random sequence vectors are scaled with or multiplied by the intentional error parameter vectors to generate confidential pseudo-random keyed intentional error vector sequences. The pseudo-random keyed intentional error sequences are reproduced versions of the confidential pseudo-random keyed intentional error sequences that are generated in the reference apparatus 20 from the same confidential seeds and intentional error parameters. In step 318 the vector sequences are smoothed by filtering to match the filtering in the GNSS reference apparatus 20. The filtering may provide interpolation vectors and/or control the distributions of the vectors in spreads for the keyed intentional errors.

In step 326 the GNSS rover 40 receives GNSS position-determination reference data having the synthetic reference carrier phases for the reference erroneous positions and the true reference position. In step 328 the GNSS rover 40 receives GNSS signals. In step 332 the GNSS rover 40 measures carrier phases at its position. In step 334 the GNSS rover 40 uses the true reference position and differences between the rover carrier phases and the synthetic reference carrier phases to determine rover erroneous positions. The rover erroneous positions have the keyed intentional errors that match the keyed intentional errors in the reference erroneous positions.

In step 342 the keyed intentional error sequences are combined. Finally in step 344 the GNSS rover 40 sums the sequences for the combined keyed intentional errors and the rover erroneous positions to provide the subscribed rover positions. The steps 342 to 344 may be combined into a single operation.

FIGS. 10A, 10B and 10C show configurations for the vector error scalers 128,188 for box, cylindrical and spherical intentional keyed error boundaries. The vector error scalers 128 and the vector error scaler 188 operate similarly to generate the 1st through nth keyed intentional errors in the GNSS reference apparatus 20 and reproduce the Ath through Cth subscribed keyed intentional errors in the subscribed GNSS rover 40. The Ath through Cth keyed intentional errors are usually a subset of the 1st through nth keyed intentional errors. The vector error scaler 128,188 receives the confidential pseudo-random sequences "a", "b" and "c" having uniform distributions with ranges of +1 to −1 and scales these sequences with an intentional error parameter set to provide a vector sequence of keyed intentional errors having coordinate values in orthogonal x, y and z dimensions in space. The intentional error parameter set includes a shape parameter and one or more size parameters. The shape parameter confines the keyed intentional errors to a box shape, a cylindrical shape, a spherical shape, or other three dimension shapes. The size parameter confines the size of the coordinate values in x, y and z orthogonal dimensions in space. The vector error scaler 128 in the GNSS reference apparatus 20 can use the approximate location coordinates of the subscribed GNSS rovers 40 in order to perform coordinate transformations to account for the curvature of the earth to orient the x, y, z dimensions at the GNSS reference apparatus 20 to North, East, Up dimensions at the GNSS rover 40.

For a box shape (FIG. 10A), the vector error scaler 128,188 receives the intentional error parameters for X. Y and Z. The vector error scaler 128,188 multiplies the "a", "b" and "c" confidential sequences by the X, Y, and Z parameters to provide sequences having ranges of −X to +X, −Y to +Y and −Z to +Z with coordinate values for x, y and z orthogonal dimensions, respectively. The sizes of the X, Y and Z intentional error parameters confine the error boundaries for the size and shape of the box. For example the Z might be smaller or larger than the X and Y to flatten the box or make it taller in the z dimension. The same is true for the X and Y.

For a cylindrical shape (FIG. 10B), the vector error scaler 128,188 receives the intentional error parameters for R (radius) and H (height). The vector error scaler 128,188 converts the "a" confidential sequence into a sequence of rho angles ($\rho$) of a cylinder with a uniform distribution in the range of +180 to −180 degrees. The vector error scaler 128,188 multiplies the "b" confidential sequence by the R parameter to provide a sequence having the range −R to +R and multiplies this by a sequence for $\cos(\rho)$ to provide coordinate values in the x dimension in a range of −R $\cos(\rho)$ to +R $\cos(\rho)$. The vector error scaler 128,188 multiplies the "b" confidential sequence by the R parameter to provide a sequence having the range −R to +R and multiplies this by a sequence for $\sin(\rho)$ to provide a sequence of coordinate values in the y dimension in a range of −R $\sin(\rho)$ to +R $\sin(\rho)$. The vector error scaler 128,188 multiplies the "c" confidential sequence by the H parameter to provide a sequence having coordinate values in the range −H to +H for the z dimension. The size and ratio of the R and H intentional error parameters controls the size and shape of the cylinder. For example the H might be smaller or larger than the R to flatten or heighten the cylinder in the z dimension.

For a spherical shape (FIG. 10C), the vector error scaler 128,188 receives the intentional error parameter R (radius). The vector error scaler 128,188 converts the "a" confidential sequence into a sequence having the range of +180 to −180 degrees to provide a rho angle ($\rho$) of the sphere. The vector error scaler 128,188 converts the "c" confidential sequence to a sequence having the range of +90 to −90 degrees to provide a theta angle ($\theta$) the sphere. The vector error scaler 128,188 multiplies the "b" confidential sequence by the R parameter to provide a sequence having the range −R to +R and multiplies this by a sequence for $\cos(\rho)$ and a sequence for $\cos(\theta)$ to provide a sequence of coordinates values in the range −R $\cos(\rho)\cos(\theta)$ to +R $\cos(\rho)\cos(\theta)$ in the x dimension. The vector error scaler 128,188 multiplies the "b" confidential sequence by the R parameter to provide a sequence having the range −R to +R and multiplies this by a sequence for $\sin(\rho)$ and a sequence for $\cos(\theta)$ to provide a sequence of coordinates values in the range −R $\sin(\rho)\cos(\theta)$ to +R $\sin(\rho)\cos(\theta)$ in the y dimension. The vector error scaler 128,188 multiplies the "b" confidential sequence by the R parameter to provide a sequence having the range −R to +R and multiplies this by a sequence for $\sin(\theta)$ to provide a sequence of coordinate values in the range −R $\sin(\theta)$ to +R $\sin(\theta)$ in the z dimension.

Confidential Access

It should be noted that there are many apparatus and methods that can be used to provide a confidential channel and confidential access for the subscribed confidential error key from the GNSS reference apparatus 20 to the GNSS rover 40. For example, a trusted courier could provide a confidential access for the subscribed confidential keys as data in a subscriber identity module (SIM) card or some other portable memory device. Or, an encrypted message could be transmitted in a signal or posted in a web site. The term "confidential" is used in this application to mean not available to the public, private and secret. The term "non-confidential" is used in this application to mean available to the public and not secret. A signal transmission or posting in a web site provides confidential access if it can only be decoded with a key that is confidential. A signal transmission or posting in a web site is non-confidential if it can be decoded without having access to a key that is confidential.

The FIGS. 11A and 11B are block diagrams of a confidential access 200 whereby the GNSS reference apparatus 20 provides subscribed confidential error keys to the subscribed GNSS rovers 40 in the system 10. An Rth GNSS rover 40 having a subscription is described. The confidential access 200 includes reference and rover confidential key messengers 111 and 162. The rover confidential key messenger 162 includes a first secret key 202, a second secret key 204, a public key generator 206, a private key generator 207, rover key transmitter 208, a subscription key receiver 210, and a confidential error key extractor 212. The first key generator 202 generates a secret first decryption key for the Rth GNSS rover 40. The second key generator 204 generates a secret second decryption key for the Rth GNSS rover 40. The public key generator 206 uses the first and second code keys to generate an Rth rover public key. The private key generator 207 uses the first and second keys to generate and an Rth rover private key. The first and second decryption keys should be very large prime numbers so that, even with a powerful computer, it would be impossible or at least impractical to recreate these keys from the Rth rover public key. The Rth rover private key and the Rth rover public key might be generated just once, for example when the Rth GNSS rover 40 is built, and then retained in its memory.

The rover key transmitter 208 makes the Rth rover public key available in the roverkey signal 34. Later, the subscription key receiver 210 receives a keymsg signal 36 from the GNSS reference apparatus 20. The keymsg signal 36 carries encrypted subscribed confidential error keys for all the subscribed GNSS rovers 40. The subscribed confidential error keys intended for a particular GNSS rover 40 are encrypted by the rover public key for that GNSS rover 40. All GNSS rovers 40 might receive the keymsg signal 36 but only the particular GNSS rover 40 with the rover private key can decrypt and extract the confidential error keys for which that GNSS rover 40 has subscribed. The confidential key extractor 212 in the Rth GNSS rover 40 uses the rover private key to decrypt and extract the Rth subscribed confidential error key set from the keymsg signal 36. The other subscribed GNSS rovers 40 can receive the same keymsg signal 36, but only the Rth GNSS rover 40 can decrypt and extract the Rth confidential error key set because only the Rth GNSS rover 40 has the rover private key.

The reference confidential key messenger 111 includes a public key receiver 232, a confidential error key encrypter 234, and a subscription key transmitter 236. The public key receiver 232 receives the roverkey signal 34 having the Rth rover public key and the roverkey signals 34 for the rover public keys from all the other GNSS rovers 40 having subscriptions in the system 10. The public key receiver 232 passes the identifications of the Rth GNSS rover 40 and all the other GNSS rovers 40 to the subscribed precision catalog 110. The subscribed precision catalog 110 identifies the subscribed precisions for the Rth GNSS rover 40 and the other subscribed GNSS rovers 40 and passes the associated subscribed confidential error keys to the confidential error key encrypter 234. The confidential error key encrypter 234 uses the Rth rover public key and the other rover public keys to encrypt the subscribed confidential rover key sets for which the Rth GNSS rover 40 and the other GNSS rovers 40 have subscribed and passes the encrypted subscribed confidential error key sets to the subscription key transmitter 236. The subscription key transmitter 236 issues all of the encrypted confidential error key sets in the keymsg signal 36. The transmitters and receivers 208, 210, 232 and 236 can be radios to communicate the roverkey signal 34 and/or the keymsg signal 36 with wireless signals or connections into a public telephone network to communicate by posting and viewing from a web site or emails.

FIG. 12A is a flow chart of instruction steps of a program 350 stored in a memory 64 in a GNSS rover 40 for a method of confidential access to the subscribed confidential error keys for the precision for which it has subscribed. The instruction steps are embodied in a tangible non-transitory medium to be read and executed by one or more computer processors 62 for directing the operation of the GNSS rover 40. In step 352 a particular subscribed Rth GNSS rover 40 generates a secret first decryption key. In step 353 the Rth rover generates a secret second decryption key. The first and second decryption keys are secret and private for the Rth GNSS rover 40. In step 354 the Rth rover uses the first and second decryption keys for generating an Rth rover public key. In step 355 the Rth rover uses the first and second decryption keys for generating an Rth rover private key. The first and second decryption keys and the rover public key may be generated once and then retained in memory. In step 356 the Rth rover makes the Rth rover public key generally available. Later, in step 358 the Rth rover receives encrypted subscribed confidential error key sets as contents of a message. And, in step 362 the Rth rover uses the Rth rover private key to decrypt and extract the Rth rover subscribed confidential error key set from the message. In general, the message has encrypted subscribed confidential error key sets for other GNSS rovers 40. The Rth rover can see the message for the other rover public keys but it does not have the secret keys necessary to decrypt or extract the subscribed confidential error key sets for the other GNSS rovers 40 and vice versa.

FIG. 12B is a flow chart of instruction steps of a program 380 stored in a memory 54 in a GNSS reference apparatus 20 for providing confidential access to subscribed confidential error keys to a subscribed GNSS rover 40 for a subscribed precision. The instruction steps are embodied in a tangible non-transitory medium to be read and executed by one or more computer processors 52 for directing the operation of the GNSS reference apparatus 20. In step 382 the GNSS reference apparatus 20 receives the rover public keys from the Rth rover and other GNSS rovers 40 having subscriptions in the system 10. In step 384 the reference apparatus uses the Rth public key and other rover public keys to encrypt the confidential error key sets for the precisions for which the Rth GNSS rover and other GNSS rovers 40 have subscribed. In step 386 the GNSS reference apparatus 20 makes the encrypted confidential error key sets available as contents of a message to provide the confidential access to the Rth rover and the other GNSS rovers for the confidential error key sets for their subscribed precisions according to their subscriptions.

It is to be understood that these detailed descriptions are not to be interpreted as limiting. Various alterations and modifications will no doubt become apparent to those skilled in the art after having the benefit of reading the above descriptions. Accordingly, it is intended that the appended claims be interpreted as covering all alterations and modifications as fall within the true spirit and scope of this disclosure.

The invention claimed is:

1. A GNSS reference apparatus, including:
a vector error generator to generate a sequence of reference erroneous positions by combining one or more sequences of keyed intentional errors, the keyed intentional error sequences made confidential with one or more confidential error keys, respectively; and
a reference data server to issue GNSS position-determination reference data based on the reference erroneous positions to enable GNSS position determination where the keyed intentional errors for at least one of the confidential sequences are reversible with confidential access to a corresponding at least one of the confidential error keys wherein, the vector error generator includes a seed generator to combine a non-confidential frame number with a particular one of the confidential error keys to generate a particular one of the keyed intentional error sequences as a pseudo-random sequence, where the pseudo-random sequence is reproducible at a GNSS rover in data frames with the non-confidential frame number and the particular confidential error key.

2. The GNSS reference apparatus of claim 1, further including:
a synthetic reference carrier phase processor to synthesize GNSS reference carrier phases for the reference erroneous positions from GNSS signals, and wherein the reference data server is configured to provide the synthesized GNSS reference carrier phases in the GNSS position-determination reference data.

3. The GNSS reference apparatus of claim 1, wherein:
the GNSS position-determination reference data is composed to permit a GNSS rover having the confidential access to use the at least one confidential error key for the GNSS position determination.

4. The GNSS reference apparatus of claim 1, further including:
a subscribed precision catalog to classify the confidential error keys and the corresponding keyed intentional error sequences as subscribed or non-subscribed; and
a confidential key messenger to enable the confidential access for the subscribed confidential error keys for the GNSS position determination with a subscribed precision resulting from the non-subscribed keyed intentional error sequences.

5. The GNSS reference apparatus of claim 4, wherein:
the confidential key messenger includes a public key receiver to receive first and second rover public keys for first and second GNSS rovers, respectively, where the first rover public key was associated with a first rover private key for a first GNSS rover and the second rover public key was associated with a second rover private key for a second GNSS rover; a confidential key encrypter to encrypt first and second sets of the subscribed confidential error keys with the first and second rover public keys, respectively; and a subscription key transmitter to issue the encrypted first and second subscribed confidential error key sets for decryption with the first and second rover private keys for the GNSS position-determination only for the first and second GNSS rovers, respectively.

6. The GNSS reference apparatus of claim 1, wherein:
the GNSS position determination reference data is composed so that the confidential access to a first but not a second confidential error key enables the GNSS position determination with a precision degraded by the second but not the first keyed intentional error sequence.

7. The GNSS reference apparatus of claim 1, wherein:
the vector error generator includes first and second vector error encoders to use a first and a second of the confidential error keys to generate a first and a second of the keyed intentional error sequences, respectively; and a vector summer to combine the first and second keyed intentional error sequences with a reference position to generate vectors for the reference erroneous position sequence.

8. The GNSS reference apparatus of claim 7, wherein:
the GNSS position determination reference data is composed for the confidential access to the first but not the second confidential error key to confine a maximum positional error for the GNSS position determination to be greater than a maximum positional error of the reference position but less than a maximum positional error corresponding to the reference erroneous position sequence.

9. The GNSS reference apparatus of claim 1, wherein:
the vector error generator includes subscription filters associated with the confidential error keys to filter the keyed intentional error sequences, respectively; and a position spread filter to filter the sum of the keyed intentional errors sequences, the combination of a particular one of the subscription filters and the position spread filter constructed to distribute a particular one of the keyed intentional error sequences into a spread associated with a corresponding particular one of the confidential error keys.

10. The GNSS reference apparatus of claim 9, wherein:
the subscription filter includes a non-linear part to confine the spread within particular error boundaries associated with the particular confidential error key.

11. The GNSS reference apparatus of claim 1, further including:
an intentional error parameter generator to provide intentional error parameter sets associated with the confidential error keys, respectively, to define shapes and sizes of the corresponding confidential sequences of keyed intentional errors.

12. The GNSS reference apparatus of claim 11, wherein:
the shapes are selectable by the intentional error parameter sets as a box, a cylinder, or a sphere.

13. The GNSS reference apparatus of claim 1, further including:
an intentional error parameter generator to associate a particular intentional error parameter set with a particular one of the confidential error keys; and wherein:
the vector error generator includes pseudo-random sequence generators to use the particular one of the confidential error keys to generate confidential pseudo-random sequences;
and a vector error scaler to scale the confidential pseudo-random sequences with the particular intentional error parameter set to provide a particular one of the sequences of keyed intentional errors as vectors having an error zone having a shape and a size controlled by the intentional error parameter set.

14. The GNSS reference apparatus of claim 1, further including:
a confidential key generator to generate the confidential error keys to be irreversible.

15. A method for providing GNSS reference data for determining a GNSS-based position, including steps of:
   using one or more confidential error keys for making one or more sequences of keyed intentional errors confidential in a GNSS reference apparatus;
   generating a sequence of reference erroneous positions in the GNSS reference apparatus by combining the one or more confidential keyed intentional error sequences; and
   issuing GNSS position-determination reference data from the GNSS reference apparatus based on the reference erroneous positions to enable GNSS position determination where the keyed intentional errors for at least one the confidential sequences are reversible with confidential access for a corresponding at least one of the confidential error keys; filtering the one of more keyed intentional error sequences with subscription filters respectively associated with the confidential error keys; and filtering the sum of the keyed intentional error sequences to distribute a particular one of the keyed intentional error sequence into a spread associated with a corresponding particular one of the confidential error keys wherein the step of filtering includes applying a non-linear gain for confining the spread within error boundaries associated with the particular confidential error key.

16. The method of claim 15, further including a step of:
   synthesizing GNSS reference carrier phases in the GNSS reference apparatus for the reference erroneous positions from GNSS signals; and wherein the GNSS position-determination reference data includes the synthesized GNSS reference carrier phases.

17. The method of claim 15, further including a step of:
   composing the GNSS position-determination reference data to permit a GNSS rover having the confidential access to use the at least one confidential error key for the GNSS position determination.

18. The method of claim 15, further including steps of:
   classifying the confidential error keys and corresponding keyed intentional error sequences as subscribed or non-subscribed; and
   providing the confidential access for the subscribed confidential error keys for the GNSS position determination with a subscribed precision resulting from the non-subscribed keyed intentional error sequences.

19. The method of claim 18, wherein:
   the step of providing the confidential access includes receiving first and second rover public keys for first and second GNSS rovers, respectively, where the first rover public key was associated with a first rover private key and the second rover public key was associated with a second rover key; encrypting first and second sets of the subscribed confidential error keys with the first and second rover public keys, respectively; and issuing the encrypted first and second subscribed confidential error key sets for sets for decryption with the first and second private rover keys for the GNSS position determination only for the first and second GNSS rovers, respectively.

20. The method of claim 15, wherein:
   the GNSS position determination reference data is composed so that the confidential access to a first but not a second confidential error key enables the GNSS position determination with a precision degraded by the second but not the first keyed intentional error sequence.

21. The method of claim 15, wherein:
   the step of generating the reference erroneous position sequence includes using a first and a second of the confidential error keys for generating a first and a second of the keyed intentional error sequences respectively, and combining the first and second keyed intentional error sequences with a reference position for generating vectors for the reference erroneous position sequence.

22. The method of claim 21, wherein:
   the GNSS position determination reference data is composed for the confidential access to the first but not the second confidential error key to confine a maximum positional error for the GNSS position determination to be greater than a maximum positional error of the reference position but less than a maximum positional error corresponding to the reference erroneous position sequence.

23. The GNSS method of claim 14, further including:
   providing intentional error parameter sets associated with the confidential error keys, respectively, for defining shapes and sizes of the corresponding confidential sequences of keyed intentional errors.

24. The method of claim 23, wherein:
   the shapes are selectable by the intentional error parameter sets as a box, a cylinder, or a sphere.

25. The method of claim 14, further including steps of:
   associating a particular intentional error parameter set with a particular one of the confidential error keys; and wherein:
   the step of generating the sequence of reference erroneous positions includes using the particular one of the confidential error keys for generating confidential pseudorandom sequences; and scaling the confidential pseudorandom sequences with the particular intentional error parameter set for providing a particular one of the sequences of keyed intentional errors as vectors having an error zone having a shape and a size controlled by the intentional error parameter set.

26. The method of claim 14, wherein:
   the step of generating the reference erroneous position sequence includes combining a non-confidential frame number with a particular one of the confidential error keys for generating a particular one of the keyed intentional error sequences as a pseudorandom sequence, where the pseudo-random sequence is reproducible at a remote site in data frames with the non-confidential frame number and the particular confidential error key.

27. The method of claim 14, further including a step of:
   generating the confidential error keys in the GNSS reference apparatus to be irreversible.

\* \* \* \* \*